United States Patent

Breitkopf et al.

[15] 3,639,071
[45] Feb. 1, 1972

[54] MACHINE TOOL TABLE POSITION LOCATING

[72] Inventors: Walter J. Breitkopf, Scottsdale; Jack L. Bayer; Leon F. Bayer, both of Phoenix, all of Ariz.

[73] Assignee: Bayer Industries, Inc.

[22] Filed: Apr. 9, 1970

[21] Appl. No.: 26,811

[52] U.S. Cl..................................408/91, 408/25, 408/31, 269/56, 269/69, 269/289
[51] Int. Cl........................................B23b 39/06
[58] Field of Search................408/69, 70, 91; 269/56, 69, 269/289

[56] References Cited

UNITED STATES PATENTS

| | | | |
|---|---|---|---|
| 3,557,642 | 1/1971 | Schmidt | 408/91 |
| 3,566,720 | 3/1971 | Phillips | 408/91 |

FOREIGN PATENTS OR APPLICATIONS

| | | | |
|---|---|---|---|
| 668,881 | 3/1952 | Great Britain | 408/91 |

*Primary Examiner*—Theron E. Condon
*Assistant Examiner*—Neil Abrams
*Attorney*—Drummond, Cahill & Phillips

[57] ABSTRACT

A machine tool table position locating means adapted to provide stop positions for work-holding table which is movable relative to a machine frame on which tool holding and driving means is adapted to machine work held on the work-holding table. The position locating means comprising a plurality of pin-holding plates having a plurality of stations each including a plurality of openings disposed to carry pins, the pins being placeable in a receiver on a movable position locating carriage so as accumulatively to dispose variously dimensioned pins in the receiver to be engaged between an engaging member coupled to the work-holding table and a stop means supported on the table carriage of the machine.

15 Claims, 27 Drawing Figures

PATENTED FEB 1 1972

INVENTORS
WALTER J. BREITKOPF
JACK L. BAYER
BY LEON F. BAYER

Drummond, Cahill & Phillips

ATTORNEYS

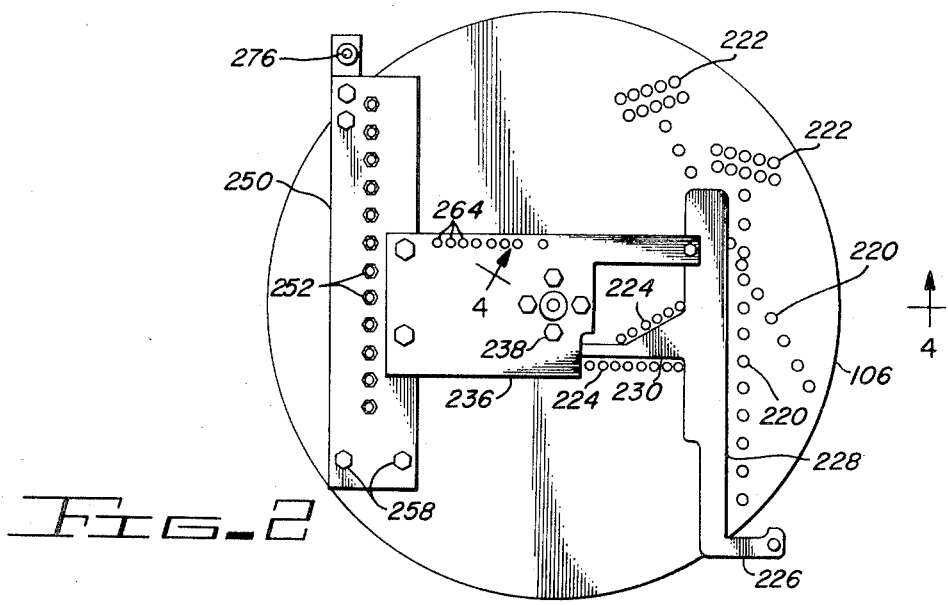
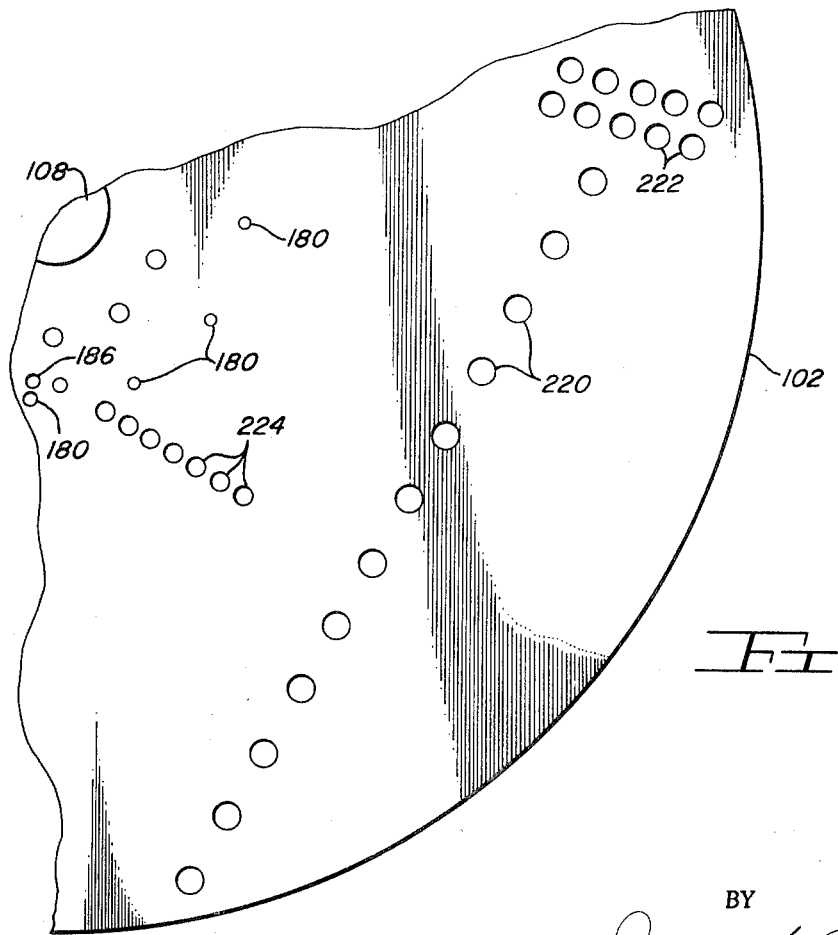

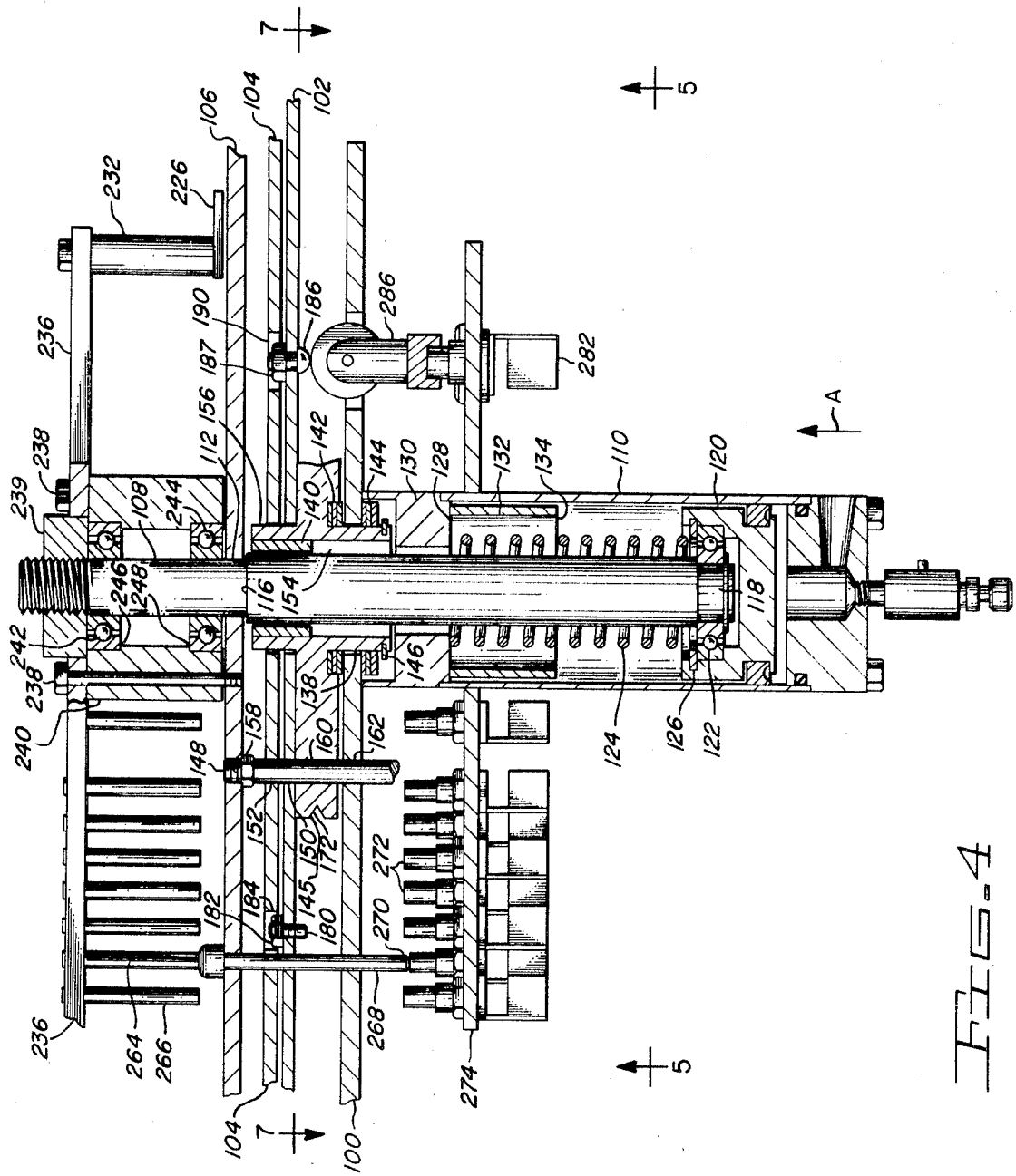

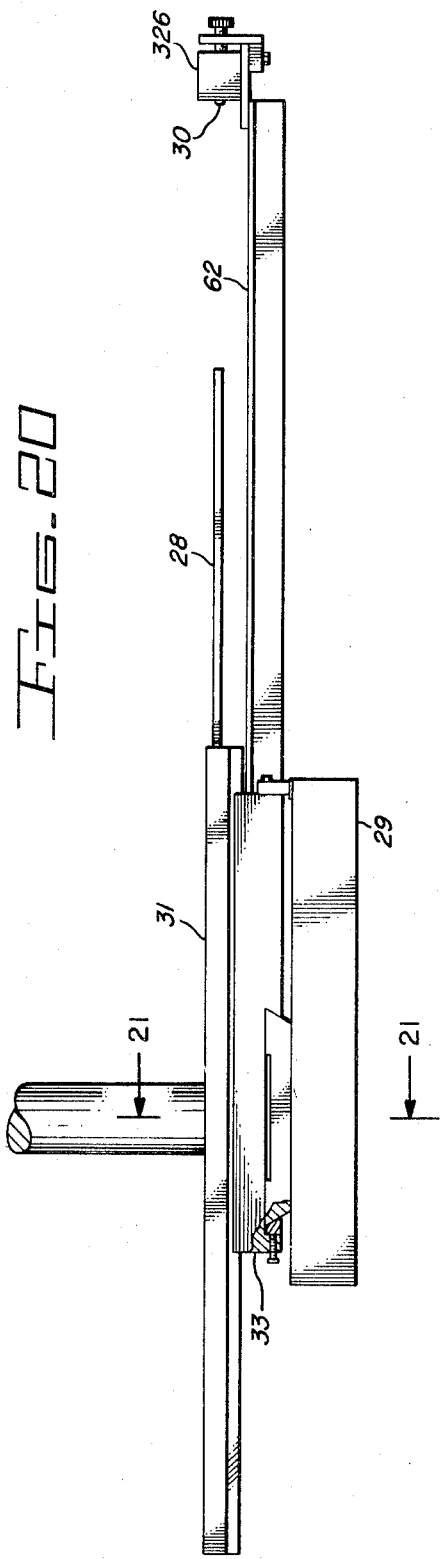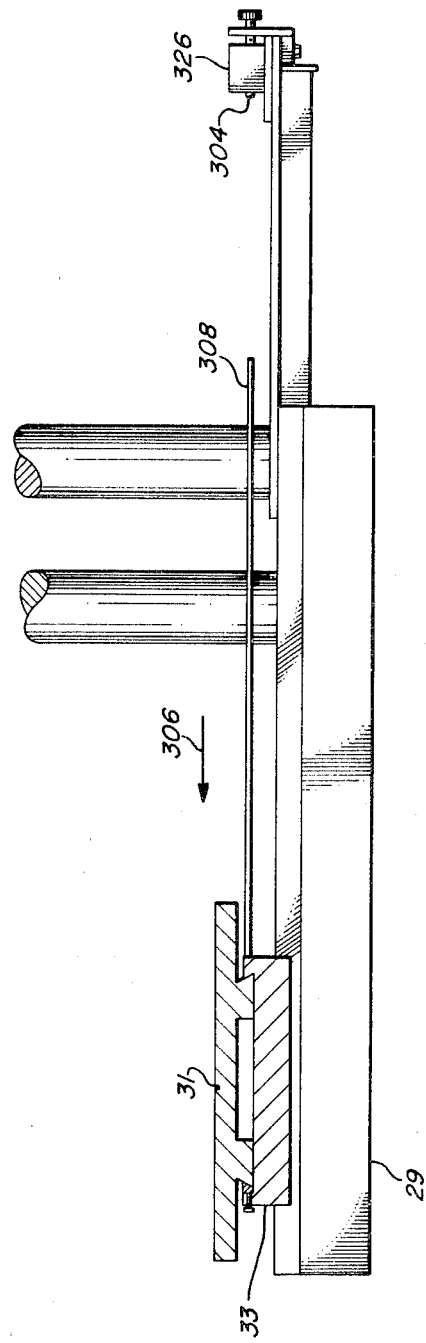

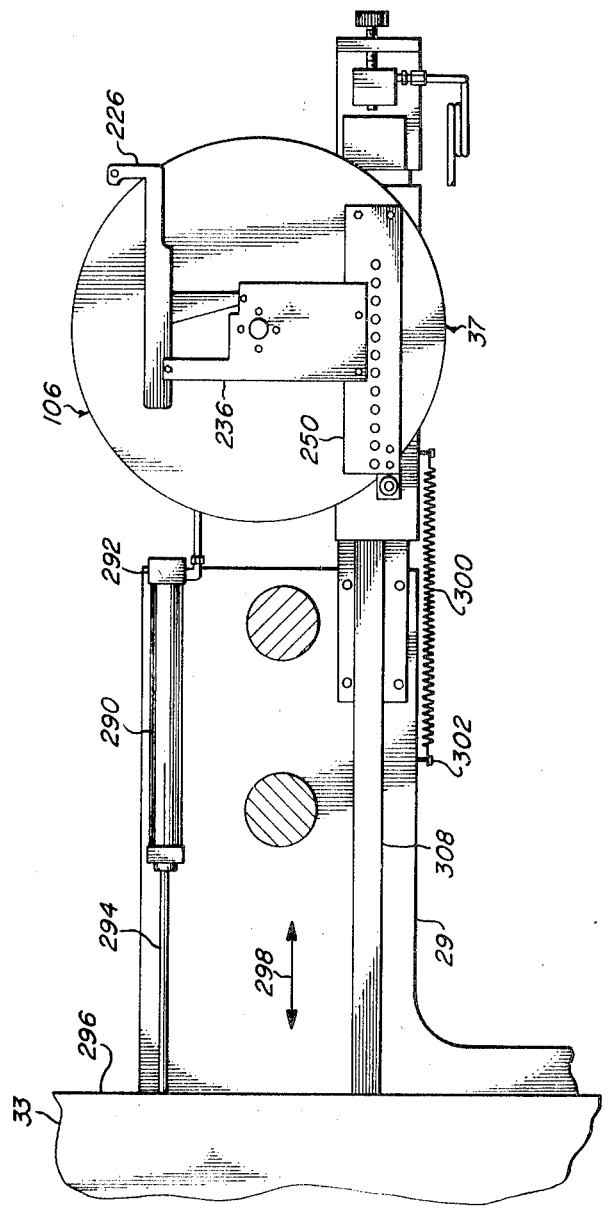

MACHINE TOOL TABLE POSITION LOCATING

In the automatic control of work holding tables for machine tools it has been conventional practice to utilize a recorded media and very complicated electronics programming equipment together with various mechanical and electromechanical devices for precisely stopping or locating a work holding table relative to a tool holding and driving means of a machine. It has been common practice to locate a work holding table of a machine tool relative to two axes or two directions of movement of a table which directions are generally at substantially right angles to each other. Many of the prior art machine tools which are programmed for predetermined and successive machining operations on various work have been very complicated and expensive and further have been difficult to set up for simple or varied machining operations on such work.

Additionally, such prior art machine control devices have been so complex that extremely skilled help has been required for setting up a predetermined succession of machining operations to be performed in various locations relative to a part carried by the work holding table of a machine tool. Additionally, some of the prior art machines have required the production of a programming sheet or recording before the machine may be put into productive use. Accordingly, many prior art machines have required considerable time for setting them up to perform a plurality of successive machining operations on a given piece of work. Many prior art machines have lacked simplicity so as to enable the economic use of such machines in the setup for a small number or a relatively large number of parts to be machined. Furthermore, many of the prior art machines which are programmed for a plurality of successive machining operations are not sufficiently versatile to provide successive machining operations which are greatly varied as for example, drilling, tapping, reaming, boring, milling, and other similar operations. Various prior art machines which are automatically programmed for a plurality of successive machining operations on a given piece of work have been very complex, expensive, complicated to set up and operate and additionally, such machines are usually very expensive to maintain.

In accordance with the present invention, a precision machine tool is provided with very simple mechanical programming means for drilling, boring, tapping and milling, all of which operations may be successively and automatically accomplished on a single part carried by a work holding table of the machine.

The simple mechanical programming means of the invention comprises rotary plate assemblies disposed on locating carriages and the plate assemblies are each provided with a plurality of station areas each having a plurality of first and second holes adapted to support and hold first and second precision dimensioned members or pins which may be of varying diameters. These plate assemblies may be rotated and axially actuated relative to a receiver, therebelow, which is provided with openings adapted to receive variously dimensioned first and second pins accumulatively disposed to be engaged between an engaging member on the movable work holding table of the machine and a precision stop means supported stationarily on the table carriage of the machine so that the work holding table is stopped in a position according to the various pins placed in the receiver by the rotatable and axially operable plate means. Each plate assembly carries a plurality of machine setups in accordance with the pins disposed in the openings in the various station areas of the plate means.

The plate assemblies of the invention each comprise a plurality of plates actuated on a locating carriage which is movable on the main frame of the machine in a direction parallel to the movement of the work holding table of the machine and this combination of mechanical features may be utilized in at least two directions of movement of the work holding table relative to the main frame of the machine to thereby provide for precision locating of work on the table relative to a tool holding and driving means of the machine. The tool holding and driving means of the machine comprising a rotary toolholder having a turret carrying plurality of power operated spindles adapted to be automatically indexed relative to a predetermined axis for machining work on the work holding table of the machine. Switch means may be selectively operable work holding the rotary turret of the tool holding and driving means so that such switches may be coupled in circuitry with programming switches operable by selective means of the rotary plate means of the invention and thus to coordinate the work holding table movements of the machine as well as the positioning and driving of various tools relative to work on the work holding table in at least two axes of movement. All of the mechanisms of the invention are very simple and readily set up so as to perform automatically a plurality of successive machining operations on work carried by the work-holding table of the invention.

Each position locating means of the invention comprises a position locating carriage which supports rotatable and axially movable plate assemblies having pluralities of stations, each station having a plurality of first and second openings and each position locating carriage having a receiver provided with corresponding first and second pin receiving openings. Each position locating carriage, as well as the respective receiver and plate means, is movable between an engaging member, carried by a work holding table, and a respective stop means carried by a table carriage on the main frame of the invention. Thus, a plurality of variously dimensioned pins, in the holes of the receiver of the locating means, may accumulatively provide precision stop dimensions for limiting the movement of the work holding table relative to the main frame of the machine when moved to position work on the work holding table relative to a predetermined axis of a tool holding and driving means of the invention.

The invention also comprises novel shock-absorbing means which cushions the rectilinear action of the work holding table as it is brought into a precision stop position relative to the main frame of the invention.

Accordingly, it is an object of the invention to provide a very simple and economical mechanically programmed machine tool and table position locating means which may be readily and easily set up to successively accomplish a substantial variety of machining operations on a given part or workpiece carried by the work holding table of the machine of the invention.

Another object of the invention is to provide a machine tool table position locating means having a very simple mechanical means for locating a stop position of a movable work holding table of the machine tool. The mechanism of the invention comprising a movable position locating carriage rectilinearly movable in parallel relation to the direction of movement of the work holding table, said position locating carriage supporting a very simple assembly of pin carrying plates having several station areas, each area having first and second openings therein for carrying first and second precision dimensioned pins; the plates being rotatably mounted as well as axially movable relative to the position locating carriage in order to be actuated so as to position variously dimensioned pins carried in said first and second openings of said plates in corresponding first and second openings of said plates in corresponding first and second openings in a receiver on the locating carriage so that a plurality of said first and second pins may be disposed in said receiver to be accumulatively and dimensionally engaged by an engaging member on the work holding table of the invention and by a precision stop means supported on the frame of the machine tool of the invention and so that the work holding table may be precisely stopped at a predetermined position in accordance with the pins deposited in said receiver by said plate means.

Another object of the invention is to provide a machine tool table position locating means as hereinbefore described wherein first and second position locating means are disposed relative to a single machine tool work holding table and relative to a tool holding and driving means having a plurality of positionable tools and wherein a plurality of first switches are selectively operable relative to the tools and wherein second and third switches are operable by said first and second position locating means; said first, second and third switches being adapted for coupling with control circuitry to coordinate the operation of a work holding table and tools carried by said spindles to perform automatically a plurality of successive machining operations on work carried by the work holding table of the invention.

Another object of the invention is to provide a machine tool table position locating means which may be very readily and easily set up by ordinary machine tool operators whereby computer or electronic programming skill is not required.

Another object of the invention is to provide a machine tool table position locating means which is so arranged that it employs a plurality of stations, each station automatically movable to a receiver position to set up an individual precise stop position for a work holding table of a machine tool which thereby provides for a great number of automatically operable positions of the table of the machine tool.

Another object of the invention is to provide a machine tool table position locating means having a plate assembly which may be readily set up and may be removable or replaceable relative to a position locating carriage of the machine to thereby greatly increase the combinations of mechanically programmed functions of the invention.

Another object of the invention is to provide a machine tool table position locating means which includes very simple and reliable operating mechanisms.

Further objects and advantages of the invention may be apparent from the following specification, appended claims and accompanying drawings.

FIG. 2 is an enlarged plan view taken from the line 2—2 of FIG. 1 showing a pin holding plate means of the invention having first and second pin carrying holes and a setup bar superimposed thereover for setting up pins in the holes of the plates relative to various station areas each of which contains a plurality of first and second pin receiving holes;

FIG. 3 is an enlarged fragmentary sectional view of one of the plates shown in FIG. 2 and showing the first and second pin receiving holes of the invention on enlarged scale;

FIG. 4 is an enlarged fragmentary sectional view taken from the line 4—4 of FIG. 2;

Figure 1:
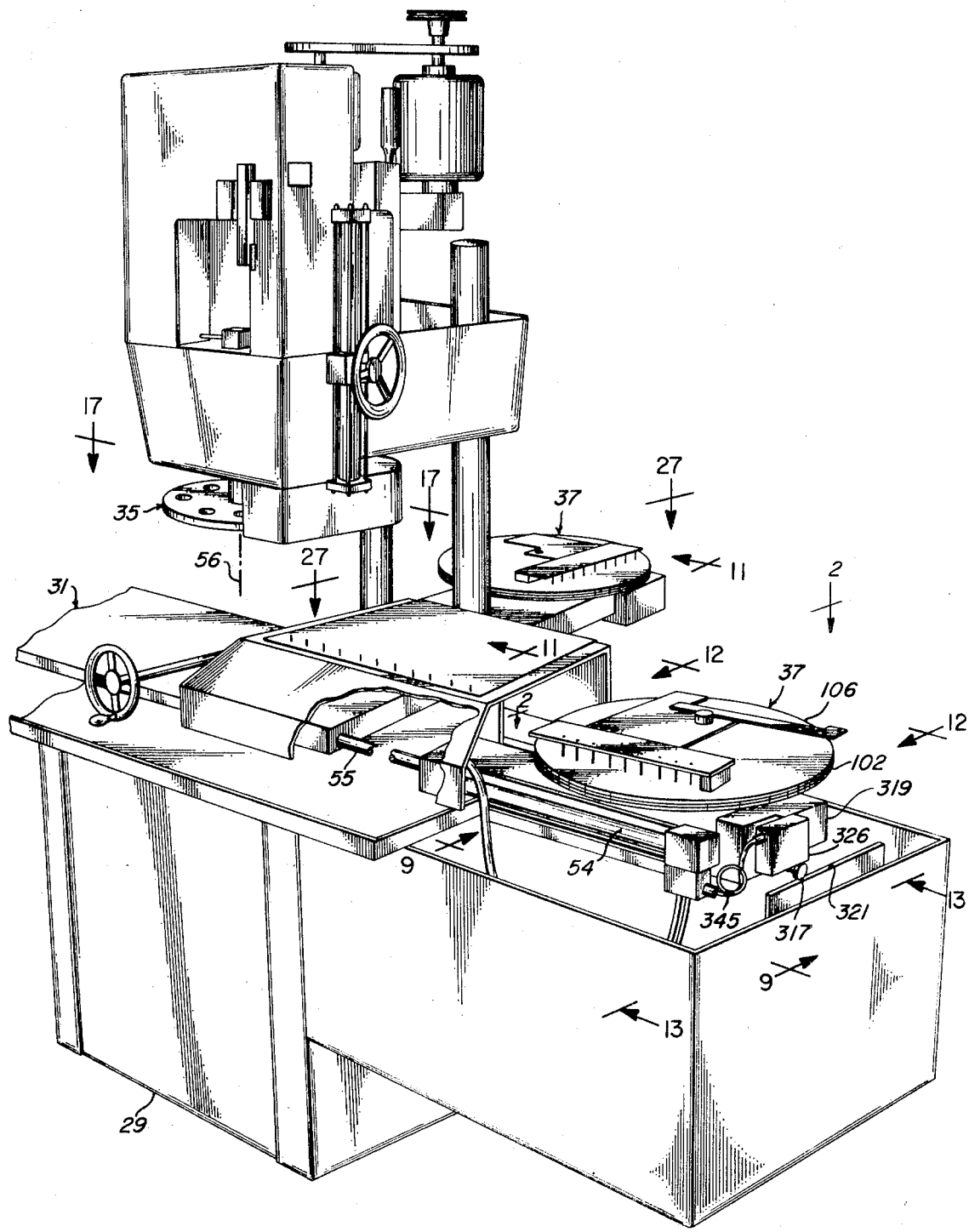
FIG. 1 is a perspective view of a machine tool of the invention having the machine tool table position locating means of the invention in connection therewith.
Figure 7:
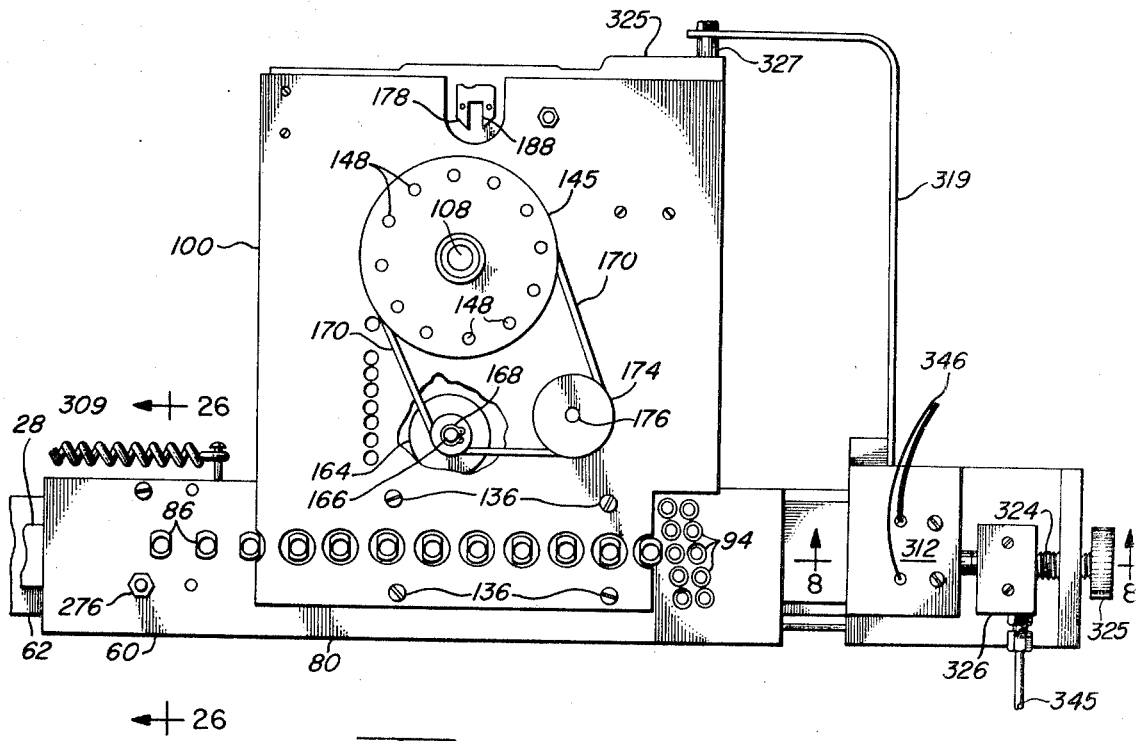
FIG. 7 is a reduced plan sectional view taken from the line 7—7 of FIG. 4 showing driving and indexing mechanism used in connection with the pin carrying and locating plates of the invention.
Figure 22:
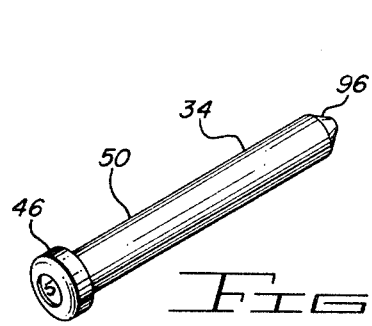
Figure 23:
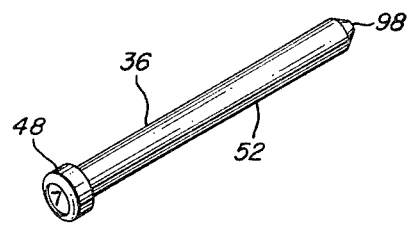
Figure 25:
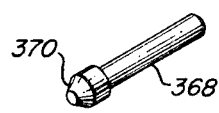
Figure 24:
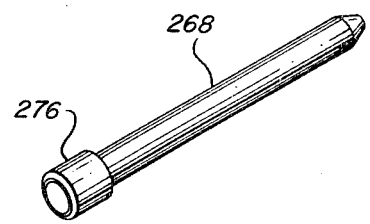
Figure 26:
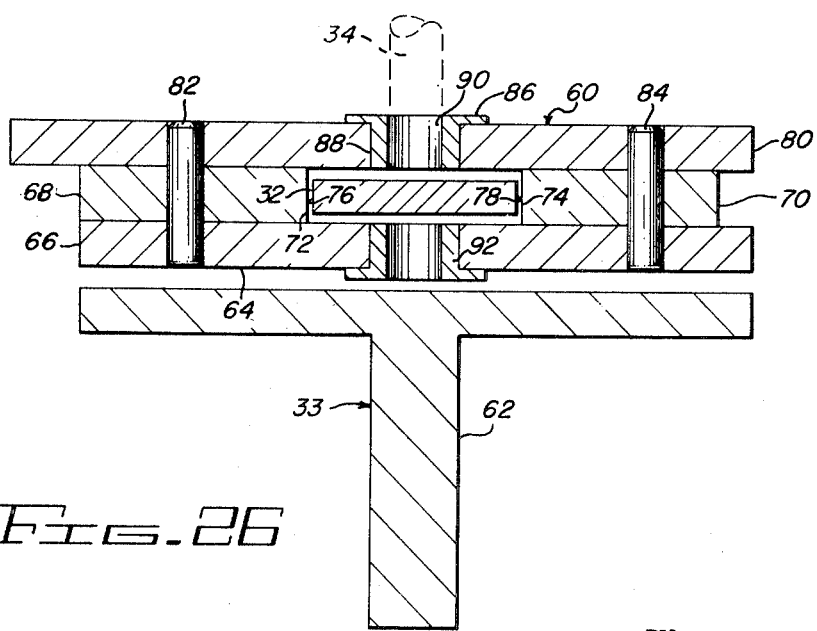
Figure 9:
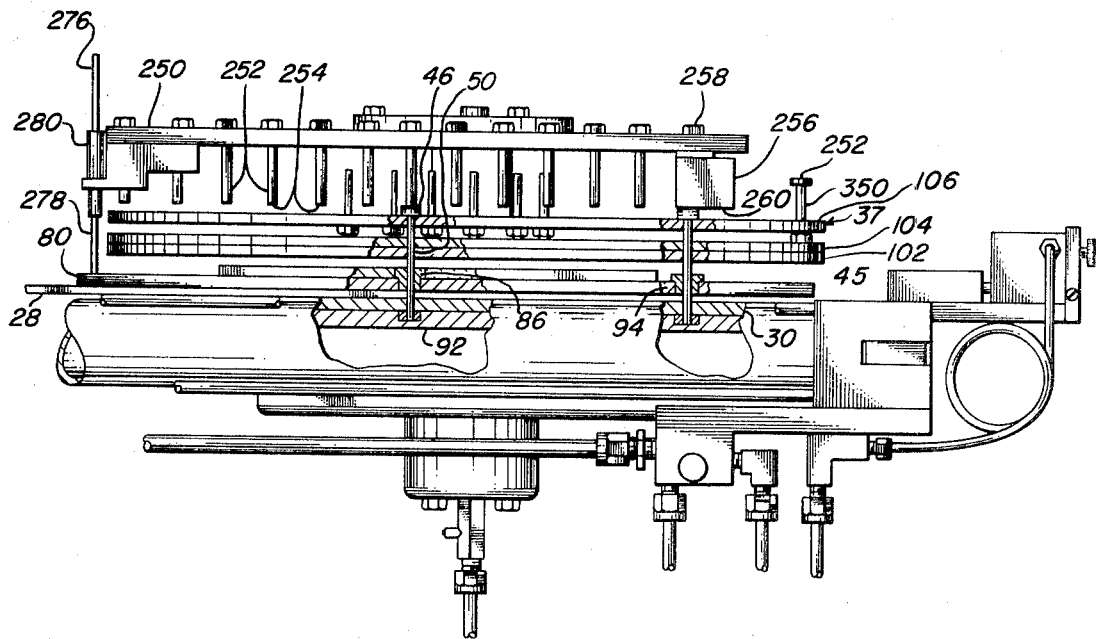
Figure 10:
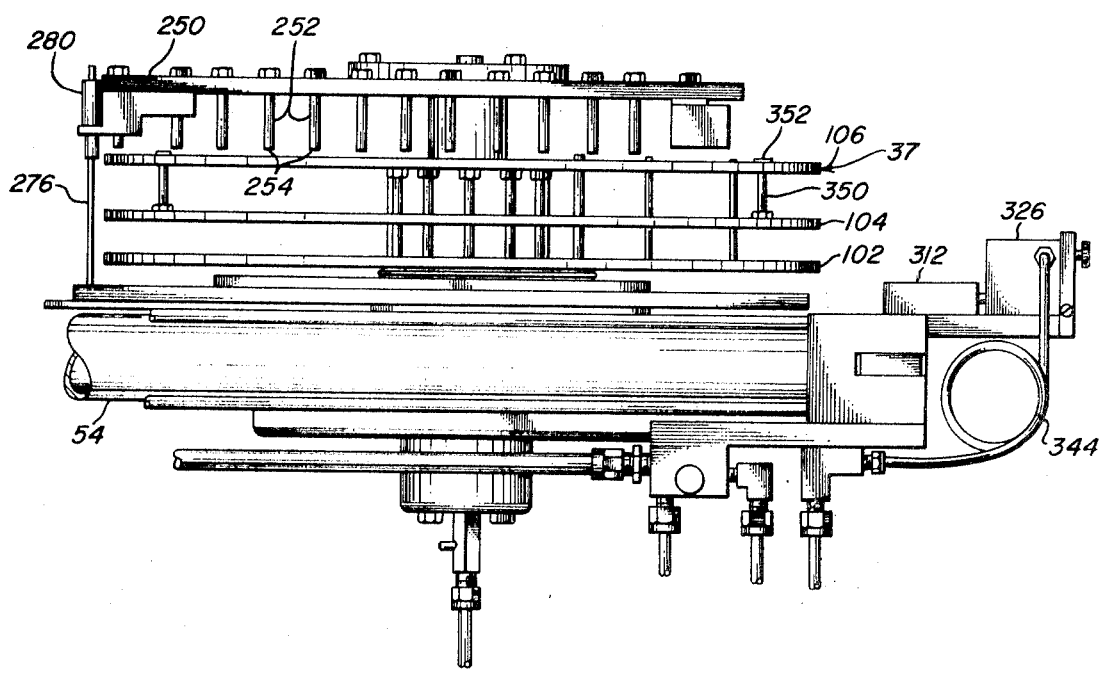
Figure 11:
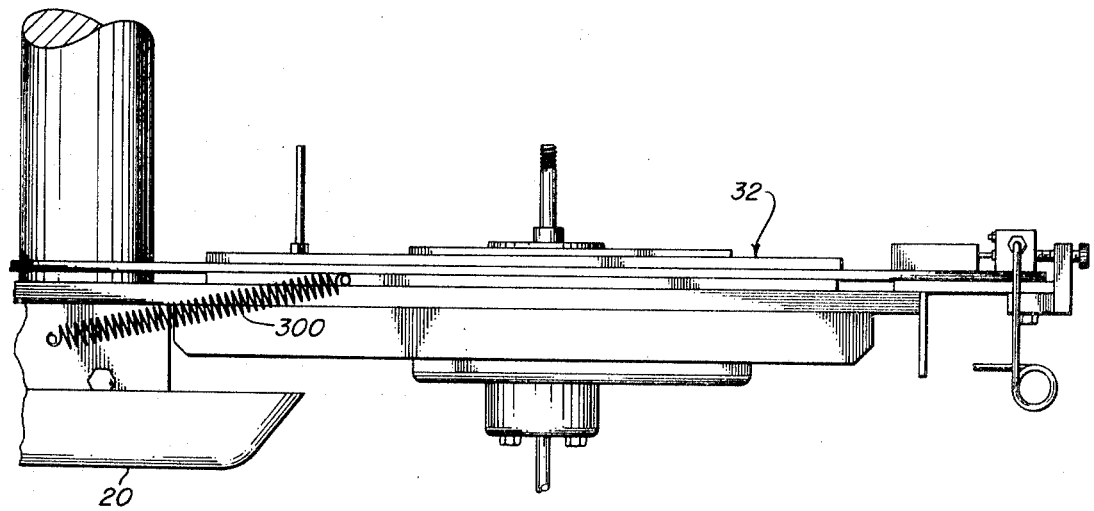
Figure 12:
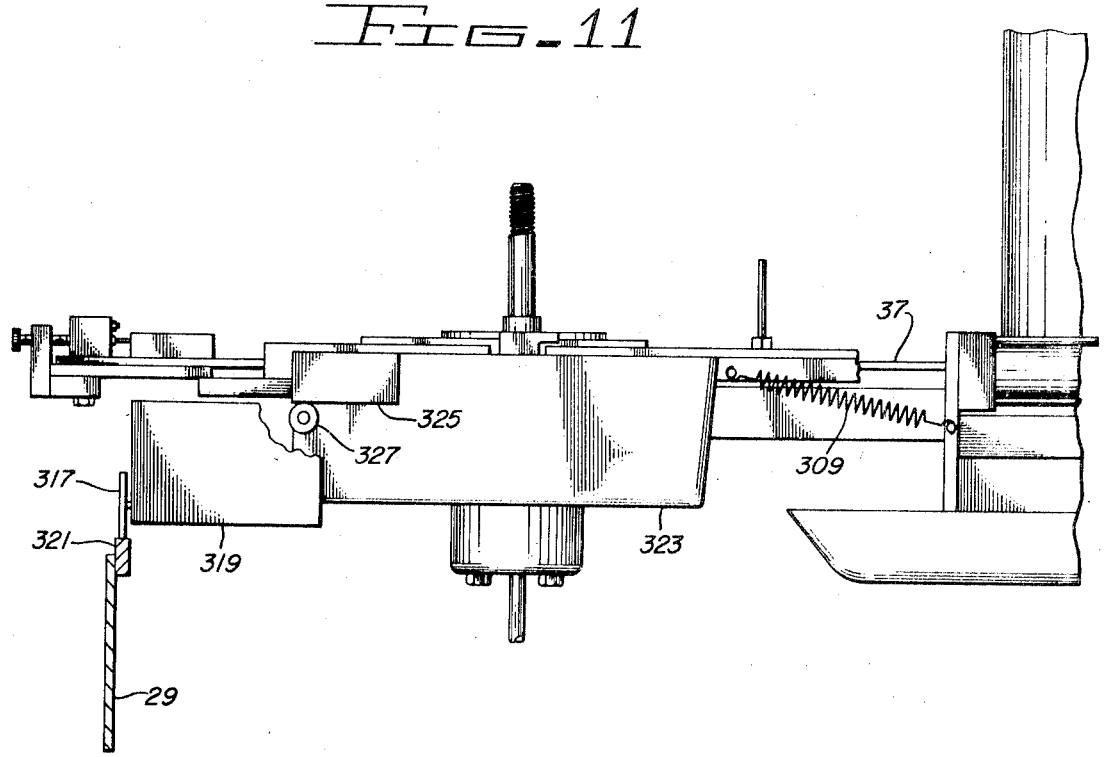
Figure 13:
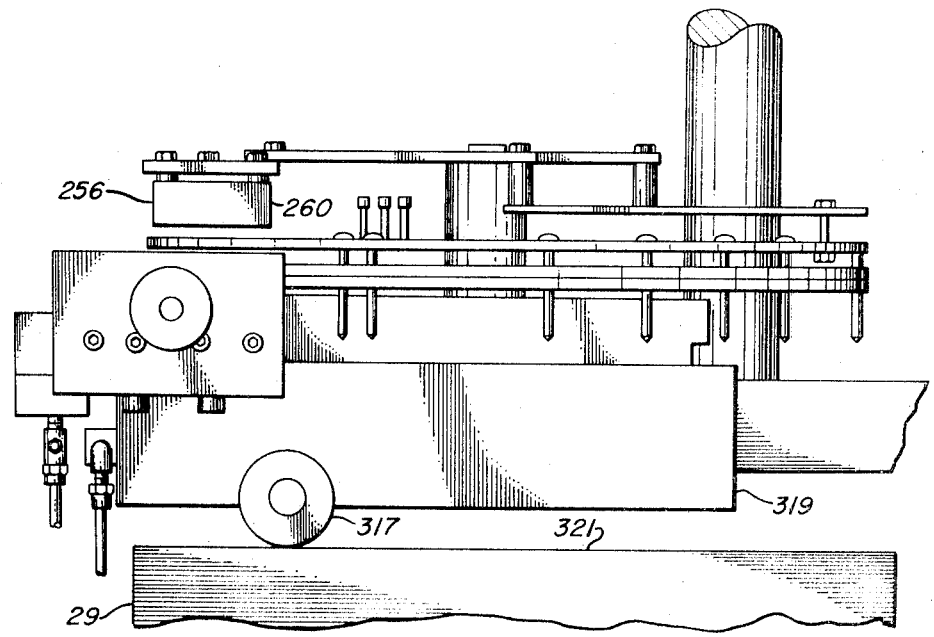
Figure 14:
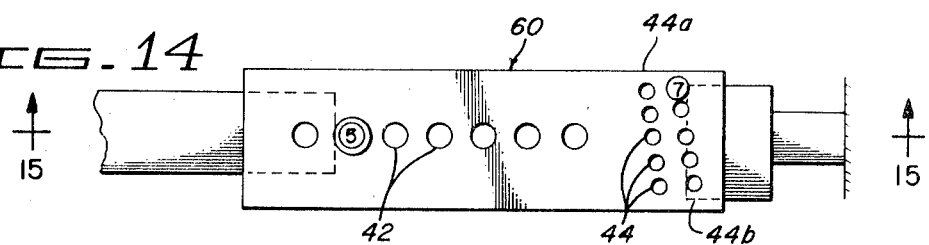
Figure 15:
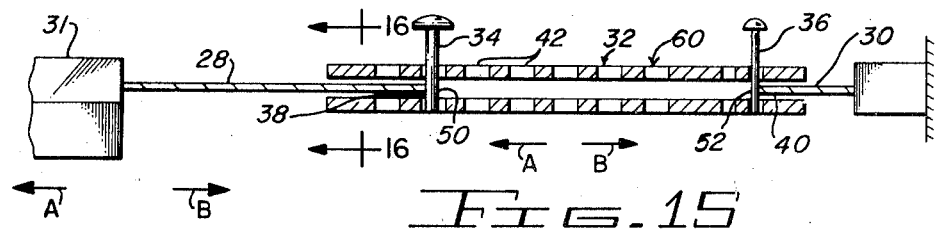
Figure 16:
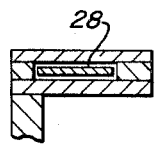
Figure 17:
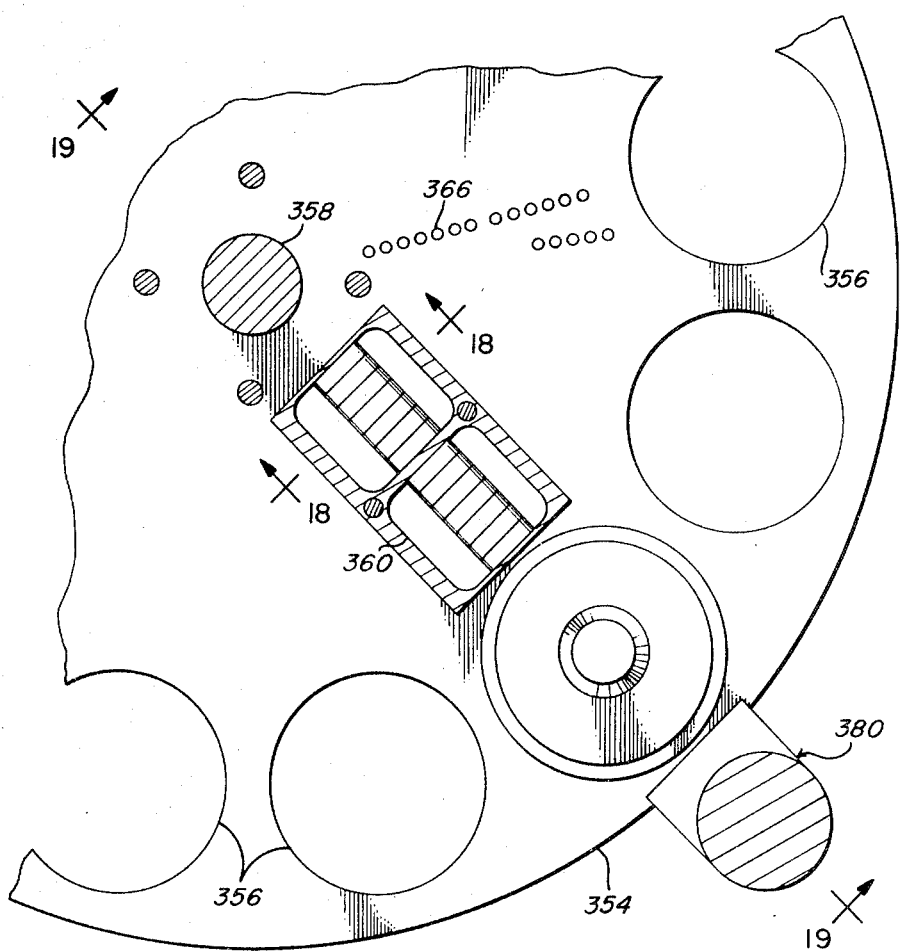
Figure 18:
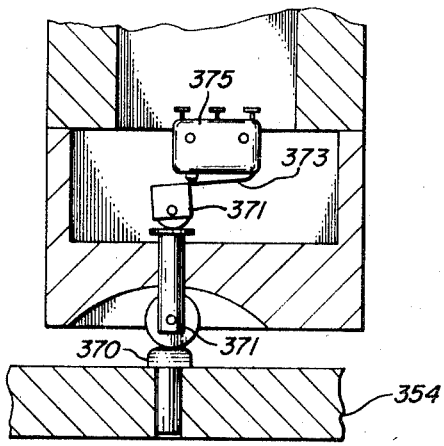
Figure 19:
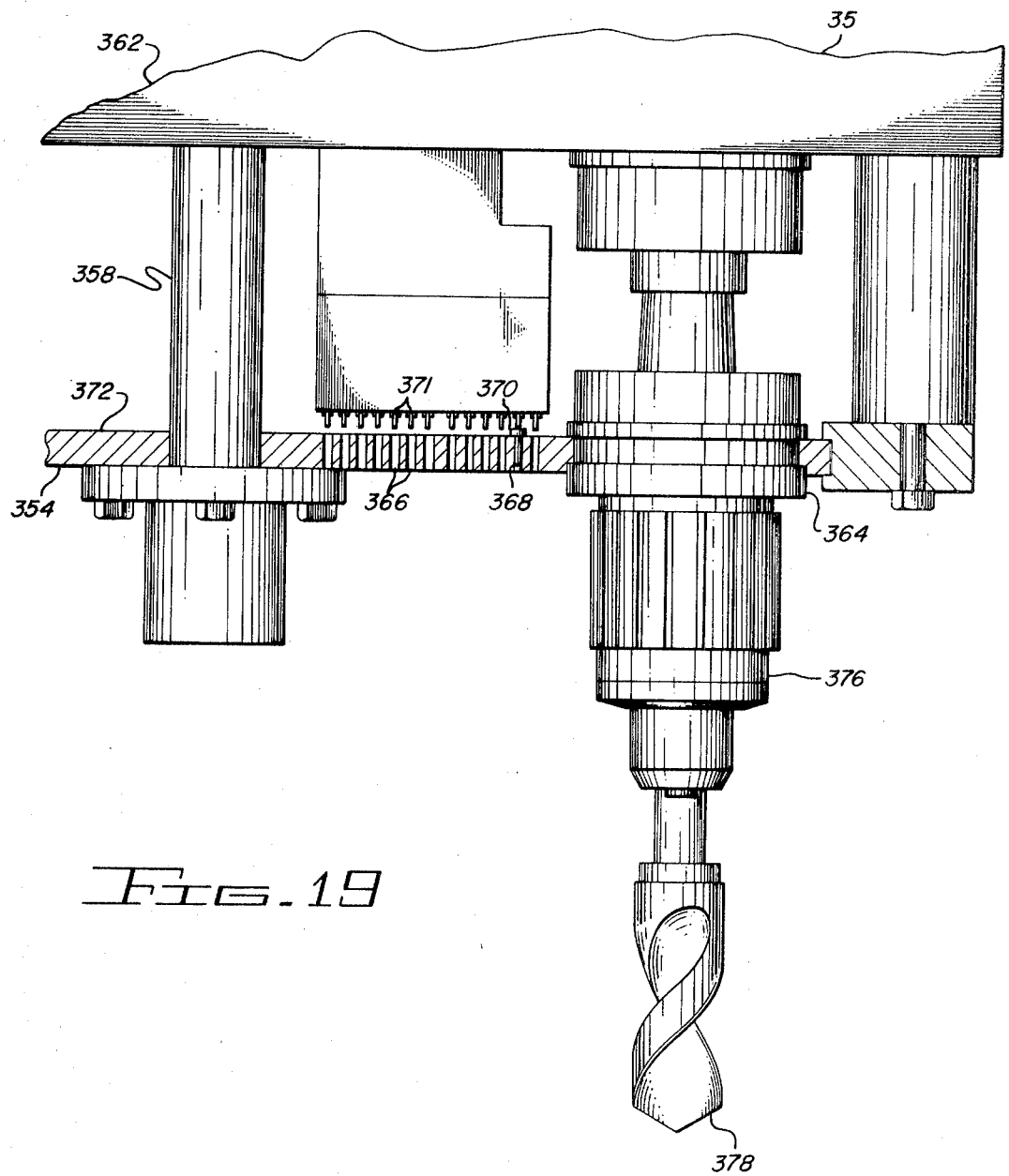

FIG. 9 is an enlarged fragmentary elevational view taken from the line 9—9 of FIG. 1 showing the locating pin carrying plate assembly mechanism of the invention and showing further portions broken away and in section to illustrate the disposition of pins in a receiver for holding the pins in position to be engaged between a bar or engaging member, carried by a work holding table, and a precision stop means carried by the table carriage of the invention;

FIG. 10 is a view similar to FIG. 9 but showing the pin holding plate mechanism of the invention in upwardly disposed retracted position for withdrawing the setup pins, carried thereby, from the pin receiver of the table positioning mechanism of the invention;

FIG. 11 is a view taken from the line 11—11 of FIG. 1 and showing one of the rotary and axially movable pin holding plate assemblies of the invention removed from a rotating and axially actuating shaft in order to illustrate the removal of an entire pin holding plate assembly including a programming setup identified by pins carried by the plates in certain station areas;

FIG. 12 is an enlarged fragmentary elevational view taken from the line 12—12 of FIG. 1 showing one of the pin holding plate assemblies of the invention removed from its rotary and axially operable shaft and to illustrate the possibility of removing and installing a great plurality of pin holding plate assemblies for successively controlling a machine tool for a very great number of successive automatically controllable machining operations on work held on the work holding table of the invention;

FIG. 13 is an enlarged view taken from line 13—13 of FIG. 1;

FIG. 14 is a partially diagrammatic plan view of a pin receiver of the invention disposed relative to an engaging member, carried by a work-holding table of the invention, and a precision stop means and illustrating variously dimensioned pins in the receiver and accumulatively engaged between the engaging member and the precision stop means of the invention;

FIG. 15 is a diagrammatic sectional view taken from the line 15—15 of FIG. 14;

FIG. 16 is a sectional view taken from line 16—16 of FIG. 15;

FIG. 17 is an enlarged fragmentary plan sectional view taken from the line 17—17 of FIG. 1;

FIG. 18 is an enlarged fragmentary sectional view taken from the line 18—18 of FIG. 17;

FIG. 19 is an enlarged fragmentary sectional view taken from the line 19—19 of FIG. 17;

FIG. 20 is a fragmentary vertical sectional view through the table carriage and main frame of the invention;

FIG. 21 is a sectional view taken from the line 21—21 of FIG. 20 showing fragmentarily the main frame of the machine of the invention and the work holding table movably mounted thereon by the table carriage of the invention;

FIG. 22 is a perspective view of a first precision dimensioned member or pin of the invention;

FIG. 23 is a perspective view of a second precision dimensioned member or pin;

FIG. 24 is a perspective view of a carriage switch operating member;

FIG. 25 is a side elevational view of a turret switch operating member in accordance with the present invention;

FIG. 26 is an enlarged fragmentary sectional view taken from the line 26—26 of FIG. 7; and FIG. 27 is a fragmentary plan sectional view taken from the line 27—27 of FIG. 1.

As shown in FIG. 1 of the drawings, the invention is provided with a main frame 29 on which a work holding table 31 is movably mounted to be actuated in two different axes at substantially right angles to each other as will be hereinafter described. The work-holding table is supported on a table carriage 33 as shown in FIGS. 20 and 21. The work holding table 31 is mounted on the table carriage 33 so as to slide in one direction while the table carriage 33 is mounted on the main frame 29 to slide thereon in a direction at substantially right angles to the sliding direction of the work holding table 31 on the table carriage 33, all as will be hereinafter described in detail.

A tool holding and driving means 35 is provided with a turret for holding several tool holders, each of which may carry a different tool.

The various tool holders or the turret mechanism, included in the tool holding and driving means, are mounted on vertical axes and rotatable into a predetermined axis on a common driving position as will be hereinafter described.

Coupled to the work holding table 31 is a first engaging member 28 shown best in FIGS. 9, 15, and 20 of the drawings.

A stop means 30 is supported on the table carriage 33 and is substantially aligned with the first engaging member 28 as shown in FIGS. 9 and 15 of the drawings. As shown in FIG. 15, a position locating carriage 32 is adapted to hold precision dimensioned members or pins, namely, first selectable precision dimensioned pins 34 and second precision dimensioned selectable pins 36 to be engaged respectively by ends 38 and 40 of the first engaging member 28 and the stop means respectively.

The first precision dimensioned members 34 may vary in diameter in order to obtain some tolerance as will be hereinafter described with respect to openings 42 in a receiver of the position locating carriage 32 as will be hereinafter described in detail. The openings 42 are spaced precisely 1 inch apart while similar openings, provided by precision bushings, are located to receive the second precision dimensioned members 36. The openings for receiving these second members 36 are designated 44 and are shown diagrammatically in FIGS. 14 and 15. The specific structure of the bushings, relative to the hereinbefore mentioned receiver, will be hereinafter described in relation to other figures of the drawings. The openings 44 are arranged in a pair of angular rows so as to total a dimension of 1 inch from one of the openings designated 44a and another of the holes designated 44b, there being 10 of these openings 44. Each opening 44 accounts for a difference in one-tenth of an inch spacing between the ends 38 and 40 of the first engaging member 28 and the stop means 30 all as will be hereinafter described in detail.

The precision dimensioned members or pins 36 vary in diameter in order to attain some tolerance with relation to bushings forming the openings 44 as will be hereinafter described.

Reference is made to FIGS. 22 and 23 wherein the precision dimensioned members 34 and 36 are illustrated. These members are each provided with respective heads 46 and 48 having numerical designations thereon indicating, in thousandths of an inch, an undersized diameter of respective shanks 50 and 52 of these members. These shanks 50 and 52 as shown in FIG. 15 are precisely engaged by the end 38 of the first engaging member 28 and an end 40 of the stop means 30 respectively, as shown in FIG. 15 of the drawings.

The precision dimensioned members 34 are arranged in sets from 0.00 to 0.090; thus, there are 10 of such pins in each set. The precision dimensioned members 36 are provided in sets 0.000 through 0.009, there being 10 of such pin shaped precision dimensioned members 36 in each set. It will be understood by those skilled in the art that the 0.00 dimension relative to any one of the precision dimensioned members 34 means that it precisely fits a respective opening 42 while the dimensioned members 36 precisely fits a respective opening 44. The remaining pins of each of the sets of precision dimensioned members are designated numerically to indicate a respective undersized diameter of the shanks 50 and 52 of the members 34 and 36 respectively shown in FIGS. 22 and 23. Hence, the pins 34 and 36 determine 0.01 and 0.001 increments respectively.

Referring again to FIG. 15, for each cycle of operation, the work holding table 31 is retracted in the direction of an arrow "A" withdrawing the end 38 of the first engaging member 28 from a respective precision dimensioned member 34 and allowing the position locating carriage 32 to move under a spring-loaded condition in the direction of the arrow "A."

The maximum travel of the position locating carriage 32 in the direction of the arrow "A" may be 1 inch while the travel of the work holding table 31 and the first engaging member 28 may exceed that dimension in order to provide operating clearance.

During retraction of the first engaging member 28 and movement of the position locating carriage 32 in the direction of the arrow "A" to a stopped position, the precision dimensioned members 34 and 36 may be retracted and replaced by other members of the sets of the precision dimensioned members 34 and 36 for setting up another combination of dimensions to provide for a successive precision stop position of the table 31 relative to the stop means 30 which is mounted on the table carriage 33 as hereinafter described.

Power operated means such as a hydraulic cylinder 54 as shown in FIG. 1 may be utilized automatically to actuate the work holding table 31 backward and forward in the directions of the arrows "A" and "B" shown in FIG. 15. When the work holding table 31 is actuated in the direction of the arrow "B," the end 38 of the first engaging member 28 is brought to bear on one of the precision dimensioned members 34, it in turn forces the carriage 32 in a direction of the arrow "B" and causes an engagement of a precision dimensioned member 36 with an end 40 of the stop means 30 supported on the table carriage 33. Thus, a precision stop position of the work holding table 31 may be attained in one axis of movement.

In general arrangement of mechanism diagrammatically disposed in FIGS. 14 and 15 is utilized in connection with the present invention; however, the present invention relates to a position locating carriage 32 as shown in FIGS. 1, 4, 9, 10, and 13 of the drawings. This position locating carriage 32 of the invention comprises a plurality of superimposed plates rotatable about a vertical axis and movable upwardly and downwardly for successively disposing combinations of the precision dimensioned members 34 and 36 in the openings 42 and 44 of a receiver of the carriage 32. The assembly of superimposed rotary and vertically actuated plates comprises a plurality of stationed areas, each station area having a row of openings for receiving one of the precision dimensioned members 34 and other rows of openings 44 for receiving and carrying one of the precision dimensioned members 36. The invention therefore relates to a programmable means including a plurality of superimposed rotary and vertically actuated plates which may be utilized automatically to successively set up various stop positions for the work holding table 31 relative to the table carriage 33, all as will be hereinafter described in detail.

Accordingly, the work holding table 31 may be varied in position in accordance with each successive cycle of movement as indicated by the arrows "A" and "B" in FIG. 5 of the drawings, for holding the work holding table precisely below the tool operating axis of the tool holding and driving means 35. This axis being disclosed by a broken line 56 in FIG. 1 of the drawings.

As shown in FIGS. 7, 9 and 26, the position locating carriage of the invention includes a receiver 60 adapted to operate as described in relation to FIG. 15 of the drawings, this receiver 60 is constructed specifically as shown in FIGS. 7, 9, and 26.

Referring to FIG. 26 of the drawings, it will be seen that a cantilevered portion 62 of the table carriage 33 is provided with an upper surface 64 on which the receiver 60 is slidably mounted.

The receiver 60 is provided with a bottom plate 66 supporting a pair of spaced apart intermediate plates 68 and 70. Inner edges 72 and 74, of the plates 68 and 70 respectively, form guides for opposite edges 76 and 78 of the first engaging member 28. The receiver 60 is provided with a top plate 80 in contiguous relation with the plates 68 and 70 and dowel pins 82 and 84 pass through the respective plates 68 and 70 as well as the plates 66 and 80, holding the receiver 60 in proper assembly.

Figure 5:
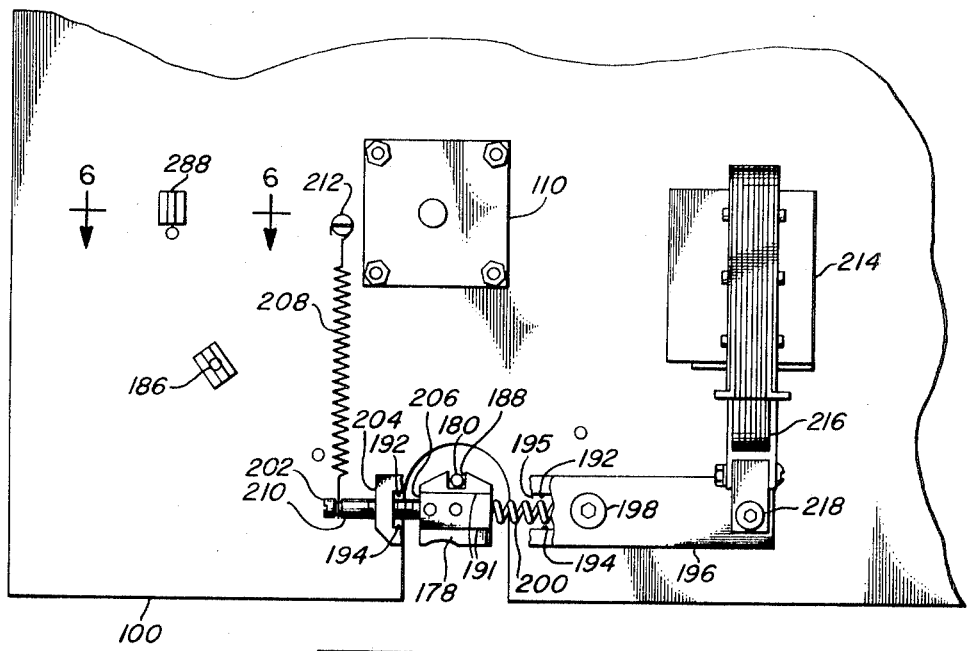
FIG. 5 is a fragmentary bottom plan view taken from the line 5—5 of FIG. 4 and showing the bottom of the mechanism disclosed therein.

Mounted in the uppermost plate 80 are precision bushings 86 and these bushings 86 as shown in FIG. 7 of the drawings, are spaced apart precisely 1 inch and correspond with the openings 42 hereinbefore described relative to FIG. 5 of the drawings. The bushings 86 are rotatably mounted in openings 88 in the plate 80 and are slightly eccentric so that they may be rotated in order to adjust the precise spacing of internal bore portions 90 of these bushings 86 relative to each other so that the centers of the bore portions 90 are precisely 1 inch apart.

It will be seen that the lower plate 66 shown in FIG. 26 of the drawings, is provided with a recess 92 disposed directly below the bore 90 of each bushing 86. Each recess 92 is adapted to receive a normally lower end portion of a precision dimensioned member 34 as shown in detail in FIG. 22 of the drawings. Thus, when a precision dimensioned member 34 is extended through one of the bushings 86 and into a corresponding recess 92 as shown in FIG. 26 of the drawings, the end portion 38 of the first engaging member 28 is precisely related to the receiver 60.

As shown in FIG. 7 of the drawings, a plurality of bushings 94 are carried by the receiver 60 in correspondence with the hereinbefore described openings 44 disclosed in FIGS. 14 and 15 of the drawings. The bushings 94 are similar to the bushings 86 only they are relatively smaller in diameter and arranged in a pattern as shown in FIG. 7 of the drawings and in correspondence with the general diagrammatic layout of FIG. 14. These bushings 94 are also slightly eccentric and are rotatable in openings in the upper plate 80 in a manner similar to that described in connection with the bushings 86 as shown in FIG. 26.

It will be seen from FIGS. 22 and 23 of the drawings, that the first and second precision dimensioned members 34 and 36 are provided with substantially conical pointed ends 96 and 98 respectively which facilitates the dropping of these pin-shaped members into the respective bore portions of the bushings 86 and 94 all as will be hereinafter described.

Mounted on the upper surface of the plate 80 of the receiver 60 is a substantially rectangular plate 100 which carries and supports actuating mechanism for a plurality of substantially circular pin holding plates 102, 104, and 106 shown in FIGS. 1, 9, and 10 of the drawings. These pin holding plates 102, 104, and 106 are adapted to carry the precision dimensioned members 34 and 36 therein by means of holes which are aligned with each other in each of the plates and which extend therethrough all as will be hereinafter described in detail. pin holding plates 102, 104, and 106, as shown in FIG. 4 of the drawings, are rotatably mounted about the axis of a plunger shaft 108 of a fluid-powered actuating cylinder 110. Additionally, the plate 106 is movable in a direction axially of the shaft 108 when it is projected and retracted relative to the cylinder 110.

It will be seen from FIG. 4 of the drawings, that the plate 106 is provided with a central opening 112 which is smaller in diameter than an enlarged diameter portion 114 of the shaft 108. Thus, the plate 106 rests on a shoulder 116 of the shaft 108.

The shaft 108 at its normally lower end 118 is rotatably mounted in a piston 120 by means of an antifriction bearing 122. This bearing 122 is the radial load bearing as well as an axial thrust bearing so that it permits the piston 120 to move the shaft 108 axially of itself and also to permit concurrent rotation of the shaft 108 relative to the piston 120 and the cylinder 110.

A compression spring 124 in the cylinder 110 bears against a washer 126 adjacent the bearing 122 and tends to retract the piston 120 downwardly together with the shaft 108 and the plate 106 as will be hereinafter described.

A normally upper end portion of the spring 124 engages an inner end 128 of an end member 130 in connection with the cylinder 110.

Abutted to the inner end 128 of the end member 130 is a stop sleeve 132 having an inwardly directed end 134 which forms a stop for the piston 120 to limit the stroke thereof in a direction of an arrow "A" shown in FIG. 4 of the drawings.

As shown in FIG. 4 of the drawings, the stroke of the piston 120 and the shaft 108 is limited by the sleeve 132 so as to provide substantially precise vertical actuation of the plate 106 and the plate 104 as will be hereinafter described in detail.

The carriage frame plate 100 as shown in FIGS. 4 and 7, is secured to the receiver 60 by means of dowels 136 and this plate 100 is provided with a central opening 138 which surrounds a bearing sleeve 140. The bearing sleeve 140 carries thrust bearings 142 and 144 secured by a snap ring 146 to maintain the bearing sleeve 140 in juxtaposed relation with the plate 100.

Mounted on the bearing sleeve 140 is a pulley 145 shown best in FIGS. 4 and 7 of the drawings. Accordingly, the pulley 145 is freely rotatably mounted relative to the plate 100 and the shaft 108 is freely slidably axially mounted in the bearing sleeve 140 for vertical actuation as will be hereinafter described in detail.

Coupled to the pin-carrying plate 106 are a plurality of driving and guide pins 148. These driving and guide pins 148 are shown best in FIG. 4 of the drawings and each guide pin 148 extends through an opening 150 in the plate 102 and through a similar opening 152 in the plate 104. The plates 102 and 104 are provided with central openings 154 and 156 which surround the bearing sleeve 140. The plate 102 rests on the upper surface of the pulley 145 and the plate 104 is adapted when in its lowermost position to rest on the plate 102 but the plate 104 is vertically slidably movable on the bearing sleeve 140 as will be hereinafter described in detail.

Each of the guide pins 148 is provided with a screw-threaded portion on its upper end, screw threaded in the plate 106 and a jam nut 158 is secured to each guide pin 148 and is jammed against the lower side of the plate 106 for holding the respective guide pins 148 in fixed position relative to the plate 106.

Each guide pin 148 extends through respective openings 150 and 152 in the plates 102 and 104 and also the guide pins 148 each extend through an opening 160 in the pulley 145. The guide pins 148 are vertically slidably mounted in the openings 150, 152 and 160 of the plates 102, 104 and the pulley 145 respectively; however, the guide pins 148 by means of their extensions through the openings 160 in the pulley 145 are adapted to rotatably drive the plates 102, 104 and 106 when the pulley 145 is rotated as will be hereinafter described. As shown in FIG. 7 of the drawings, there are 12 of the guide pins 148 which extend downwardly through the pulley 145 and also each guide pin extends through an opening 162 in the plate 100 for holding the plates 102, 104, and 106 stationary relative thereto when in their lowermost position as will be hereinafter described in detail.

A motor 164 as shown in FIG. 7 of the drawings, is mounted on a lower side of the plate 100 and is provided with a shaft 166 on which a pulley 168 is mounted. This pulley drives a belt 170 which passes around a groove 172 in the pulley 145 as shown in FIG. 4 of the drawings. This belt 170 also passes over an idler pulley 174 rotatably mounted on a shaft 176 carried by the plate 100. It will be seen that the belt 170 may slide with respect to the pulley 168 when the rotation of the plates 102, 104, and 106 in connection with the pulley 145 are stopped by means of a notched indexing dog 178 which is adapted to engage any one of a plurality of index pins 180 in connection with the plate 102. These index pins 180 extend downwardly from the plate 102 as shown best in FIG. 4 of the drawings. Each pin 180 is screw threaded in the plate 102 and is provided with a lock nut 182 which may be disposed in a conforming opening 184 in the plate 104 disposed directly above the plate 102.

Additionally, shown in FIG. 4, are switch-actuating pins 186 which project downwardly below the lower surface of the plate 102. These pins 186 are likewise provided with lock nuts 187 extending through openings 190 in the superimposed plate 104.

The relative positions of the pins 180 and 186 will be apparent from a disclosure as shown in FIG. 3 of the drawings. The operation of these index pins 180 and switch actuating pins 186 will be hereinafter described in detail.

The indexing dog 178 as shown in FIGS. 5 and 7 of the drawings, is provided with a pin receiving notch 188 which is adapted to be engaged by one of the index pins 180.

This indexing dog 178 extends above the plate 100 to a plane of the lower surface of the plates 102 so as to be in interference with the index pins 180. This dog 178 also extends from the bottom side of the plate 100 as shown best in FIG. 5 of the drawings, to the position adjacent the plate 102 hereinbefore described. This dog 178 is provided with slide rails 191. These slide rails 191 are substantially parallel and spaced apart and operate slidably between guide rails 192 and 194 of a lever 196 which is provided on a pin 198 connected to the plate 100. It will be seen that portions of the lever 196 are broken away in order to show the rails 191 of the dog 178 and to show its extension through the opening 195.

The lever 196 between its rails 192 and 194 carries a compression spring 200 which tends to force the dog 178 in one direction between the rails 192 and 194 and an adjusting screw 202 is screw threaded in an end 204 of the lever 196.

The adjusting screw 202 bears against an end 206 of the dog 178 between the rails 192 and 194 of the lever 196 and thus opposes compression of the compression spring 200 in order to adjust the location of the notch 188 of the dog 178 so that it may be precisely adjusted to engage a respective pin 180 and to maintain a precise desired rotational disposition of the plates 102, 104, and 106 relative to the bushings 86 and 94 in the receiver 60 as hereinbefore described.

A spring 208 is coupled to an end portion 210 of the adjusting screw 202 and the opposite end of the spring is secured to a screw 212 mounted on the plate 100. Thus, the spring 208 tends to pivot the dog toward the axis of the shaft 108 carried by the cylinder 110.

The lever 196 is pivoted about the bolt 198 and is operable by a conventional solenoid actuator 214 having an electromagnetically operable plunger 216 pivotally coupled to the lever 196 by means of a bolt 218.

The index pins 180 are related to stations which comprise patterns of openings in the plates 102, 104, and 106; these patterns being shown in FIG. 2 of the drawings, and there are preferably 12 index pins 180 and 12 stations including 12 similar patterns of openings which correspond with the disposition of the openings in the bushings 86 and 94 in the receiver 60 hereinbefore described.

As shown in FIG. 2 of the drawings, each station comprises a row of first openings designated 220. These openings 220 extend through the plate 106 and corresponding openings extend through the plates 102 and 104. The corresponding openings in the superimposed plates are aligned with each other.

It will be seen from FIG. 2 of the drawings, that the disclosure contains two rows of the openings 220; however, the particular geometric arrangement provides for 12 rows of openings 220 which correspond with 12 setup stations relative to the plate 106 as will be hereinafter described.

Related to each row of openings 220 is a pattern of openings 222 which correspond with the openings 44 in the bushings 94 in connection with the receiver 60 hereinbefore described.

Additionally, each station of the plate 106 is provided with openings 224 disposed substantially at right angles to the rows of openings 220. These rows of openings 224 are adapted to receive carriage switch operating members on pins for actuating control switches as will be hereinafter described in detail.

Referring to FIGS. 2 and 4 of the drawings, it will be seen that a setup bar 226 is provided with a straight edge 228 adapted to be related to a row of openings 220 in the plate 106 and this bar 226 is also provided with a straight edge portion 230 adapted to line up adjacent the respective row of openings 224.

The bar 226 as shown in FIG. 4 of the drawings, is carried by upstanding members 232 and 234 coupled to a plate 236 disposed substantially above the upper surface of the plate 106. This plate 236 is secured by bolts 238 to a hub 240 which is carried on bearings 242 and 244 surrounding the shaft 108 as will be hereinafter described.

The bolts 238 extend through the plate 236 and through the hub 240 and are screw-threadably secured at their lower ends in the plate 106.

The bearing 242 and 244 are thus clamped between the plate 236 and 106 and are shouldered at 246 and 248 respectively internally of the hub 240. Thus, the bearings maintain the plate 106 concentric with the shaft 108 and the plate 106 as hereinbefore described, is vertically shouldered on a shoulder 116 of the shaft so that it may be actuated vertically carrying the hub 240 and the plate 236 as well as the setup bar 226.

The plate 236 carries a presser plate 250 which suspends pressure pins 252 which are each adapted to press a respective precision dimensioned member 34 downwardly into one of the bushings 86 in the receiver 60. It will be seen that the members 252 are aligned in a row and spaced equally with respect to the openings 220 and with respect to the interior of the bushings 86 and the openings 42 hereinbefore described in connection with the diagrammatic disclosure of FIGS. 14 and 15.

As shown in FIG. 9 of the drawings, the suspended pressure pins 252 are provided with lower ends 254 which are adapted to engage the heads 46 of respective precision dimensioned members 34 and to press the shanks 50 of them downwardly into the bushings 86 in the receiver 60 when the plate 106 is actuated in a downward direction by the spring 124 and when fluid pressure in the cylinder 110 is relieved and allows the piston 120 to move downwardly in a direction opposite the arrow "A" as shown in FIG. 4 of the drawings.

The presser plate 250 also carries a pressure block 256 held to the presser plate 250 by means of screws 258 all as shown best in FIGS. 2 and 9 of the drawings. This block 256 is provided with a lower surface 260 adapted to engage the upper ends or heads 48 of the precision dimensioned members 36 and to force the heads 48 thereof downwardly as shown in FIG. 9 of the drawings in order to press shank portions 52 of the precision dimensioned members 45 downwardly into the bushings 94 in the receiver 60. The bushings 94 correspond to the openings 44 diagrammatically disclosed in FIGS. 14 and 15.

The plate 236 also carries a plurality of pressure pins 264 which extend downwardly from the plate 236 as shown best in FIG. 4 of the drawings. These pressure pins 264 are provided with lower ends 266 adapted to depress switch operating members or pins 268 shown in FIG. 24 of the drawings, these pins 268 being adapted to be placed in the openings 224 adjacent the setup bar portion 226 and when rotated 180°, the plates 102, 104, and 106 carry the pressure pins 268 into alignment with plungers 272 of a plurality of carriage operated switches which are mounted on a plate 274 carried by the cylinder 110 shown best in FIG. 4 of the drawings. The carriage switch operating members 268 are each provided with a head 276 engageable by a respective lower end 270 of one of the pressure pins 268 hereinbefore described.

As shown in FIGS. 2, 7, and 9, a setup bar guide post 276 is provided with a lower end 278 secured to the upper plate 80 of the receiver 60 hereinbefore described. This post 276 extends upwardly through a bushing 280 which is carried by the bar 226 in connection with the plate 236 which supports the setup bar 226. The guide post 276 is adapted to resist rotation of the plate 250, the plate 236 and the setup bar 226 while the plates 102, 104, and 106 may be rotated about the axis of the shaft 108 as hereinbefore described.

The bushings 280 are vertically slidably operable on the guidepost 276 so that the plate 250 together with the plates 236 and 274 may move upwardly when carried by the hub 240 shown in FIG. 4 as the plate 106 is raised together with the plate 104 as hereinbefore described. It will be seen that the bearings 242 and 244 as shown in FIG. 4 of the drawings, allow rotation of the shaft 108 relative to the hub 240 which is held stationarily by means of the bushing 280 on the stationary guide post 276 which is fixed to the upper plate 80 of the receiver 60 as hereinbefore described.

Figure 6:
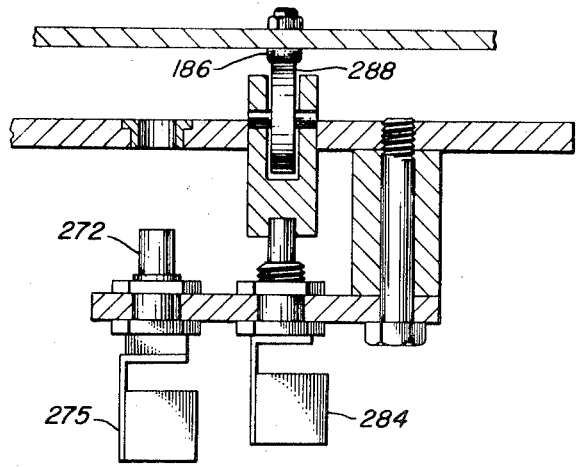
FIG. 6 is an enlarged fragmentary sectional view taken from the line 6—6 of FIG. 5 showing switch-actuating mechanism of the invention.

Operable by the pins 180 and 186 as disclosed in FIGS. 3 and 4 of the drawings are a pair of cycle control switches 282 and 284 having respective roller actuators 286 and 288 which operate these switches 282 and 284. The mounting of the switches 282 and 284 is substantially as shown in FIGS. 4 and 6 of the drawings.

These switches 282 and 284 control rotary cycle operation of the plates 102, 104, and 106 as driven by the motor 164 and its pulley 168 operating the belt 170 about the pulley 145 hereinbefore described.

As hereinbefore described in connection with FIGS. 20 and 21 of the drawings, the work holding table 31 is movably mounted on the table carriage 33 in a direction at right angles to the movably mounted arrangement of the table carriage 33 on the main frame 29.

Accordingly, a plate assembly 37 is carried in connection with the table carriage 33 and another plate assembly 37 is carried by the main frame 29 respectively for sensing relative movement of the work holding table 31 on the table carriage 33 and movement of the table carriage 33 relative to the frame 29.

As hereinbefore described, the cylinder 54, by means of its plunger 55, moves the work-holding table 31 on the table carriage 33. A cylinder 290 is mounted at 292 on the main frame 29. This cylinder 290 is provided with a plunger 294 coupled to the table carriage 296 for moving it backward and forward on the main frame 29 as indicated by the double-ended arrow 298.

As shown in FIG. 27, a return spring 300 is coupled at its one end to a pin 302 carried by the main frame 29 and the opposite end of the spring 300 is coupled to the respective plate assembly 37 in order to retract the plate assembly 37 in a manner as hereinbefore described.

As shown in FIG. 11, this spring 300 tends to move the respective assembly 37 toward the main frame 29. Thus, this spring 300 tends to move the assembly 37 shown in FIG. 11 away from the stop member 304 shown in FIG. 21 which stop member 304 is similar to the stop member 30 shown in FIG. 20 of the drawings. Thus, as the table carriage moves in the direction of an arrow 306, a second engaging member 308, carried by the table carriage 33, moves away from the stop member 304 in the same direction that the spring 300 returns the assembly 37 for the next operating cycle as will be hereinafter described.

As shown in FIGS. 7 and 12 of the drawings, a spring 309 is similar to the spring 300 and is utilized to return the respective assembly 37 relative to the table carriage 33 in a similar manner to that of the spring 300 hereinbefore described.

As shown in FIG. 26, the cantilever portion 62, of the table carriage frame, is provided with a roller 317, shown in FIGS. 1, 12, and 13. This roller 317 is rotatably mounted on a bracket 319. This bracket 319 is carried by the cantilever portion 62. The roller 317 is disposed to roll on a supporting track 321 carried by the main frame 29. Thus, the extending end of the table carriage is movably roller supported such that the roller may traverse the track in back-and-forth movements corresponding to those of the table carriage 33 on the main frame 29. The position locating carriage and plate assembly 37, together with its connected pin receiver 60, is provided with a generally cup-shaped bottom frame and cover 232 which is attached to a respective plate 100 all as shown in FIGS. 7 and 12. The bottom frame and cover 232 are provided with a roller track 325 which rides on a roller 327 carried by the aforementioned bracket 319. The receiver 60, as shown in FIG. 26, slides on surface 64 of the cantilever table carriage member 62 and track 325 moves on the roller 327 in a direction of movement of the work holding table as hereinbefore described. Thus, the position locating carriage 32 may be shifted by the spring 309 as hereinbefore described.

Figure 8:
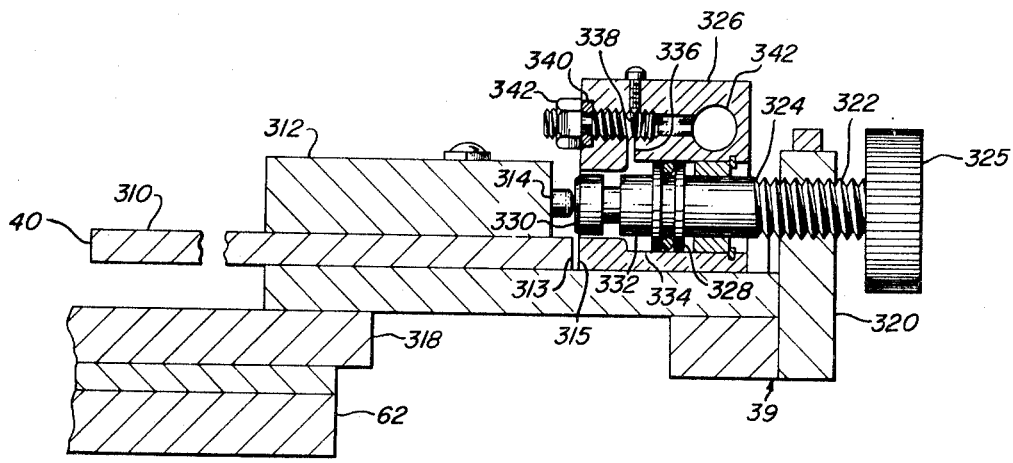
FIG. 8 is an enlarged fragmentary sectional view of hydraulic stop means of the invention taken from the line 8—8 of FIG. 7.

The stop means 30 and the stop means 304 are similar in construction and include shock absorber means as shown best in FIG. 8 of the drawings. Each shock absorber means is provided with a stop member 310. Each stop member 310 is provided with an end 40 of the stop means 30 shown in FIG. 15 of the drawings. This end 40 is adapted to engage any one of the precision dimensioned members 36 as hereinbefore described and the stop member 310 is provided with an opposite end 313 adapted to engage and abut the stop end 315 of a housing 326 as will be hereinafter described in detail.

Carried by the member 310 is a switch-operating housing 312 having a movable plunger 314 adapted to operate microswitches which are responsive to the full engagement of any one of the precision dimensioned members 36 and any one of the precision dimensioned members 34 with the stop means 30 and the engaging member 28 respectively as hereinbefore described in connection with FIG. 15 of the drawings. Thus, each switch-operating plunger 314 is adapted to close a switch in the housing 312 when the work holding table or the table carriage has moved to a stopped position relative to either of the stop means 30 or 304 as shown in FIGS. 20 and 21 of the drawings.

A stationary structure 318 is secured to either the table carriage 33 or the main frame 29 for holding a stop means relative to a respective positioning assembly 32 operable by either the respective work holding table 31 or the table carriage 33.

As shown in FIG. 8 an upstanding portion 320 of each structure 318 is provided with an internally screw-threaded bore in which a screw-threaded member 322 is screw-threadably and adjustably mounted; each member 322 is provided with an end 324 adapted to engage an end of a piston 328 reciprocally mounted in a respective housing 326. The housing 326 is movable relative to the stationary structure 318 so as to permit the end 324 of the screw-threaded member 322 to hold the piston 328 stationarily when the housing 326 is moved by means of the stop member 310 toward the structure 318 as shown in FIG. 8 of the drawings. As this happens, relative movements of the housing 326 causes fluid in a chamber portion 334 to be forced outwardly of the housing by the piston 328 as will be hereinafter described. The chamber 334 surrounds a reduced diameter portion 332 of the piston 328 and an end 330 of the piston 328 serves as a stationary abutment for the plunger 314 of the switch housing 312 so that when it is actuated in connection with the stop member 310, the housing 312 carrying a microswitch may cause actuation thereof before the ends 313 and 315 of the stop structures and the housing 326 engage.

When the housing 326 is forced toward the stationary structure 318 by means of the stop member 310 and when fluid is disbursed from the chamber 334, it passes through an orifice 336 around a restricting valve 338 and into a chamber 342 wherein it communicates with a hollow conduit 345 which contains hydraulic fluid under pressure. The hydraulic fluid thus provides a cushioning effect for the stop member 310 as it is engaged at its end 40 by pin 36 in connection with the position locating carriage 32 when it is forced in the direction of the arrow "B" as shown in FIG. 15 of the drawings, by means of the engaging member 28 in engagement with a precision dimensioned member 34. Thus, shock in connection with the positioning of either the work holding table 31 or the table carriage 33 is minimized.

Each switch housing 312 as shown in FIGS. 7 and 8 of the drawings, is provided with a pair of electrical leads 346 adapted for coupling with a control system of the invention in order to coordinate operation of the stop means 30 and the stop means 304 when fully engaged in connection with precision dimensioned members 34 and 36 relative to the respective position locating carriages 32.

The stop responsive switches carried in the housing 312 may be coupled in cooperative circuitry with the hereinbefore described switches 275 as well as the switches 284. All of the hereinbefore described switches in connection with the plate assemblies, of the position-locating carriages 32, are either operated by rotation or by axial movement of the plates 104 and 106 as caused by axial operation of the shaft 108 or rotation thereabout as described in relation to FIG. 4 of the drawings. It will be seen from FIGS. 9 and 10 of the drawings that a plurality of pickup bolts 350 are fixed at their lower ends to the plate 104 and are provided with heads 352 adapted to engage the upper plates 106 when in the position shown in FIG. 10. Thus, the plate 104 is picked up and moved vertically a substantial distance from the position shown in FIG. 9. In this manner the plate 250 together with the pins 252 and also the hereinbefore described pins 268 may be vertically moved out of contact with respective switch actuators as hereinbefore described.

Additionally, vertical movement of the plates 104 and 106 removes the precision dimensioned pin members 34 and 36 from the receiver 60 thus allowing rotation of the plates 102, 104, and 106 from station to station as hereinbefore described.

The pickup bolts 350 are so disposed that they pick up the plate 104 to a position shown in FIG. 10 when the shaft 108 is in its uppermost vertical position limited by the stop 134 in connection with the piston 120 hereinbefore described. In the position as shown in FIG. 10, the plates 104 and 106 are spaced substantially apart and tend to provide sufficient friction in relation to the shank portions of the pins 34, 36, and 268 so as to prevent them from jumping vertically out of the openings in the plate 106 when the shaft 108 is moved upward abruptly by the operation of the piston 120.

In addition to the control switches hereinbefore described, the tool holding and driving means 35 is utilized to operate control switches in accordance with the various tools that are used in connection with the multitool turret means thereof.

As shown in FIGS. 18 and 19, the tool holding and driving means 35 is provided with a turret plate 354 having a plurality of tool holder receiving openings 356 arranged in an annular row and rotatably mounted about an axis of a turret shaft 358. A switch housing 360 is carried by an overhanging frame 362 of the tool-holding and driving means 35 all as shown best in FIGS. 18 and 19 of the drawings.

It will be seen that the plates 354 as shown in FIG. 19 of the drawings, is rotatable about the shaft 358 which is suspended from the frame 362 of the tool-holding and driving means 35.

In the various openings 356 are tool holders 364 and a plurality of these tool holders are rotatable about the axis of the shaft 358 and are indexable in relation to a station over the work holding table 31. Said last mentioned station being defined by a predetermined vertical axis 56 shown in FIG. 1 of the drawings.

In relation to each opening 356 in the plate 354 are a plurality of pin receiving openings 366. These pin-receiving openings 366 are adapted to receive pins 368 as shown in FIG. 25 of the drawings. Each of these pins 368 is provided with a substantially curved head 370 which is engageable by a respective roller actuator 371. The actuators 371, as shown best in FIGS. 18 and 19 of the drawings, are disposed slightly above the upper surface 372 of the plate 354 and adapted to contact the curved head 370 of a respective pin 368. As shown in FIG. 18 of the drawings, each roller actuator mechanism 371 shown in FIG. 19, operates a pivoted arm 373 of a microswitch 375, these microswitches 375 being in plurality in the group 360 shown in FIG. 17 of the drawings. A pin 368 may be placed in any one of the openings 366 in order to activate any one of a plurality of switches 375 in the group 360 of switches. This group of switches 360 may be coupled in circuitry with the various hereinbefore described switches in order to control the machine and coordinate the operation of the tool holding and driving means 35 with respect to various tools carried in the openings of the turret plate 354 as for example, an arbor and chuck structure 376 is shown in FIG. 19 for driving a drill 378.

Likewise, various tool holders may be carried in the openings 356 of the plate 354 of the turret mechanism for performing various operations such as tapping, boring, milling, reaming, etc. Each opening 356 may be indexed at a station area as indicated at 380 in FIG. 17 which is located in juxtaposition relative to the axis 56 and work-holding table 31 of the invention.

The movable relationship of the work holding table 31 and the table carriage 33 in two different directions at right angles to each other on the frame 29 provides for disposition of the work on the work-holding table in a precise location relative to the axis of a tool such as the drill 378 shown in FIG. 19 of the drawings. Combined positioning control of the work-holding table and the table carriage is attained by means of the position locating carriages 32 as shown in FIG. 1 of the drawings, and as hereinbefore described. Assuming that each plate assembly of each position-locating carriage 32 has at least 12 different setup areas as hereinbefore described, a pair of the plate assemblies may be responsible for at least 144 combination positions of the work-holding table 31 with respect to the axis 56 of a tool such as a drill 378 or other tool shown in FIG. 19 of the drawings.

It will be appreciated that the control of the invention by means of the various switches hereinbefore described may afford automatic functioning of the plate assemblies of the position locating carriage 32 with respect to the tool-holding and driving means 35. The switches 360 being operable by the head 370 of the pins 368 as hereinbefore described, may be used to coordinate operation of the various tools as well as to control the relative rotational and axial feed and speeds thereof.

In operation, a part to be machined is fixed to the work-holding table 31 in any suitable manner common to the fixation of work to the work-holding table of various machine tools. A bar or other suitable fixture may be secured on the work-holding table 31 in order to set up a fixed position for the part in relation to the axis 56 as shown in FIG. 1 which corresponds to the axis of the station 380 shown in FIG. 17 of the drawings and as hereinbefore described. Thus, the axis 56 is always in the same predetermined position regardless of which tool in the turret plate 354 is in operation. The work-holding table 31, being movable in one direction, is carried by the table carriage 33 in another direction at right angles thereto and on the main frame 29. Accordingly, a combination of movements of the work holding table 31 on the table carriage and the table carriage on the frame 29 provides for the movement of the parts, carried on the work-holding table 31 to a position as determined by a combination of settings of the two plate assemblies of the position locating carriages 32 shown in FIG. 1 of the drawings. These assemblies, of course, are identically arranged and may be interchanged in position depending upon the setup as required. However, a plurality of these assemblies 37 may be interchanged in relation to the shaft 108 in order to provide a great variety of stop positions for the work-holding table in relation to the tool driving axis 56. A nut 239 screw threaded on the shaft 108 may be removed in relation to the hub 240 and thus allow removal of each assembly including the plates 102, 104, and 106 as hereinbefore described.

For each cycle of operation of each respective assembly, the plates 104 and 106 may be vertically actuated by means of the shaft 108 and rotatably moved in accordance with the operation of the pulley 168 which drives the pins 160 which are slidably mounted therein so that the plates 102, 104, and 106 may not only be rotated by the pins 160 but the plates 104 and 106 may have freedom of movement axially relative to the extension and retraction of the shaft 108. During each positioning cycle of the work-holding table 31, each plate as shown in FIG. 1, may be concurrently operated to position the precision dimensioned members 34 and 36 relative to the first engaging member 28 and the second engaging member 308 all as shown best in FIGS. 20 and 21 of the drawings. Further, the disposition of the precision dimensioned members 34 and 36 in relation to each plate assembly and respective receiver 60 may be accomplished as hereinbefore described in order to complete each cycle of operation. Actuation of the cylinders 54 and 290 move their respective rods 59 and 294 in connection with the work-holding table 31 and the table carriage 33 all as shown best in FIGS. 1 and 27 of the drawings. Concurrently, when these plunger shafts cause retraction of the first and second engaging members 28 and 308, as shown in FIGS. 20 and 21, the respective springs 309 and 300 retract the respective position-locating carriages 32 as shown in FIG. 1 of the drawings, so that the precision dimensioned members 34 and 36 may be withdrawn from the respective bushings 86 and 94 in the respective receiver 60. This being accomplished by extension of the shaft 108 as hereinbefore described, which moves the plates 104 and 106 to the position substantially as shown in FIG. 10 of the drawings.

With the rotation and placement of the plates 102, 104, and 106 in the next station position over the receiver 60, the shaft 108 may be withdrawn downwardly to move the plates 104 and 106 downwardly substantially to the position shown in FIG. 9 of the drawings.

When the plates 104 and 106 are in the lowermost position as shown in FIG. 9, the various switches 275 may be operable in accordance with the disposition of any one of the pins 268 in one of the openings 224 hereinbefore described.

With each rotational cycle of the plates 102, 104, and 106, the motor 164 shown in FIG. 7 of the drawings returns the plates to home position or to any one of a predetermined one of the station areas on the plates and this is accomplished in accordance with the operation of the switch actuators 286 and 288 shown in FIG. 5 which are operable by the pins 180 and 186 shown in FIG. 4 of the drawings and also shown in FIG. 3 of the drawings.

In order to prevent undue shock loading in relation to the precision dimensioned members 34 and 36 when engaged with the first and second engaging members 28 and 308 and the respective stop members 30 and 304, the hydraulic shock absorber means shown in FIG. 8 comes into action as hereinbefore described.

We claim:

1. In a machine tool table position locating means, a combination of: a main frame; a work-holding table mounted to move on said main frame in a first direction; a tool-holding and driving means carried by said frame and disposed rotatably to carry tools for machining work held on said table; a first engaging member carried by said work-holding table; a stop means supported on said main frame in spaced relation to said first engaging member; a position locating carriage movable mounted and rectilinearly movable between said first engaging means and said stop means; first and second precision dimensioned members movably supported on said locating carriage and adapted to be accumulatively engaged between said first engaging member and said stop means; a receiver on said locating carriage for said dimensioned members; said receiver having a plurality of first and second openings therein adapted respectively to receive said first and second dimensioned members, said first and second-dimensioned members being pins of precisely varying diameters adapted to be placed in said respective openings and disposed, when therein, to engage with said first engaging member and said stop means respectively; a pin holding plate means having a plurality of station areas provided with openings adapted to carry some of said first and second pins; said plate means vertically movably located above said receiver; said plate means also rotatably movable about a generally vertical axis to carry variously dimensioned ones of said pins into position over said first and second openings in said receiver; and index means for stopping rotation of said plate means in various positions about said vertical axis to align said respective first and second pins with said first and second openings of said receiver for placement of said pins therein.

2. In a machine tool table position locating means, a combination of: a main frame; a work-holding table mounted to move on said main frame in a first direction; a tool-holding and driving means carried by said main frame and disposed rotatably to carry tools for machining work held on said table; a first engaging member carried by said work holding table; a stop means spaced from said first engaging member and supported on said main frame; a position locating carriage movably mounted and rectilinearly movable between said first engaging means and said stop means; first and second precision dimensioned members movably supported on said locating carriage and adapted to be accumulatively engaged between said first engaging member and said stop means; a receiver on said locating carriage for said dimensioned members; said receiver having a plurality of first and second openings therein adapted respectively to receive said first and second dimensioned members, said first and second dimensioned members being pins of precisely varying diameters adapted to be placed in said respective openings and disposed, when therein to be engaged with said engaging member and said stop means respectively; a pin-holding plate means having a plurality of station areas provided with openings adapted to carry some of said first and second pins, said plate means movable toward and away from said receiver; said plate means also rotatably movable about a first axis and thereby adapted to carry variously dimensioned ones of said pins at said various station areas into position aligning with said first and second openings respectively in said receiver; and index means for stopping rotation of said plate means in various positions to align said respective first and second pins with said first and second openings of said receiver for placement of said pins therein.

3. The invention as defined in claim 1 wherein automatically operable actuating means is provided for actuating said plate means toward and away from said receiver in a direction longitudinally along said vertical axis thereof.

4. The invention as defined in claim 1 wherein automatically operable actuating means is provided for actuating said plate means toward and away from said receiver in a direction longitudinally along said vertical axis thereof; and rotary means for rotating said plate means relative to said receiver.

5. The invention as defined in claim 1 wherein automatically operable actuating means is provided for actuating said plate means toward and away from said receiver in a direction longitudinally along said vertical axis thereof; automatically operable rotary means for rotating said plate means relative to said receiver; and automatically operable index control means for engaging and disengaging said index means relative to said plate means for progressively indexing several of said plurality of station areas of said plate means relative to said first and second openings in said receiver.

6. The invention as defined in claim 1 wherein shock absorber means is disposed between said main frame and said stop means.

7. The invention as defined in claim 1 wherein shock absorber means is disposed between said main frame and said stop means, said shock absorber means comprising a cylinder; a piston therein; orifice means for bleeding fluid from said cylinder when under pressure by said piston; and a source means for fluid pressure communicating through said orifice means with the interior of said cylinder.

8. The invention as defined in claim 1 wherein said receiver is provided with a plurality of said first openings spaced apart in a row aligned generally in a direction of rectilinear movement of said table.

9. The invention as defined in claim 1 wherein said receiver is provided with a plurality of said first openings spaced apart in a row aligned generally in a direction of rectilinear movement of said table, said second openings in said receiver being in rows at a slight angle to said last-mentioned direction.

10. The invention as defined in claim 1 wherein said receiver is provided with a plurality of said first openings spaced apart in a row aligned generally in a direction of rectilinear movement of said table, said second openings in said receiver being in rows at a slight angle to said last-mentioned direction, said plate means at each of said station areas having a row of pin carrying openings generally corresponding with the spacing of said first openings in said receiver.

11. The invention as pin carrying in claim 1 wherein said receiver is provided with a plurality of said first openings spaced apart in a row aligned generally in a direction of rectilinear movement of said table, said second openings being in said receiver and disposed in rows at a slight angle to said last-mentioned direction, said plate means at each of said station areas having a row of pin-carrying openings generally corresponding with the spacing of said first openings in said receiver; said plate means, at each of said station areas, having rows of openings adapted to hold pins in alignment with said second openings in said receiver when the respective station area is indexed with said second openings in said receiver.

12. The invention as defined in claim 1 wherein a stationary setup bar is carried by said position locating carriage in adjacent relation to said plate means, said bar having dimensional indicia adjacent said pin holding openings in said plate means for setting up an accumulation of pin dimensions at each of said respective station areas to correspond with a desired accumulative dimensional relationship between said first and second pins when placed in said first and second openings of said receiver by said plate means.

13. The invention as defined in claim 1 wherein automatically operable actuating means is disposed for actuating said plate means toward and away from said receiver in a direction longitudinally along said vertical axis thereof whereby said plate means is moved away from said receiver to retract said pins therefrom and to thereby allow rotation of said plate means to a different predetermined station relative to said receiver for assuming a position wherein said plate means may again be moved toward said receiver for placing a different group of said first and second pins in said first and second openings for setting up another accumulative dimension adapted to provide a new location for the movement of said work-holding table into a position in which a part carried thereon may be machined by a tool in said tool-holding and driving means.

14. The invention as defined in claim 1 wherein automatically operable actuating means is provided for actuating said plate means toward and away from said receiver in a direction longitudinally along the vertical axis of said plate means; automatically operable rotary means for rotating said plate means relative to said receiver, whereby said plate means is moved away from said receiver to retract said pins therefrom and to thereby allow rotation of said plate means to a different predetermined station thereof relative to said receiver; said plate means comprising three superimposed plates having corresponding pin holding openings therein; one of said plates coupled to said rotary means; said plates having corresponding guide pin openings therein; guide pins extending through said guide pin openings for rotating said plates in unison while allowing said actuating means to move a pair of said plates toward and away from said receiver; said index means comprising a plurality of protruding members carried by said one of said plates; the locations of said protruding means corresponding to said respective station areas of said plates, said index control means carried by said position locating carriage.

15. In a machine tool table position locating means, the combination of a main frame; a work-holding table mounted to move on said main frame in a first direction; a tool-holding and driving means carried by said main frame and disposed rotatably to carry tools for machining work held on said table; a first engaging member carried by said work-holding table; a stop means supported on said main frame in spaced relation to said first engaging member; a position locating carriage movably mounted and rectilinearly movable between said first engaging means and said stop means; first and second selectable precision dimensioned members movably supported on said locating carriage and adapted to be accumulatively engaged between said first engaging member and said stop means; a receiver for said dimensioned members; said receiver having a plurality of first and second openings therein adapted respectively to receive said first and second dimensioned members, said first and second dimensioned members being pins of precisely varying diameters adapted to be placed in said respective openings and disposed when therein to engage with said first engaging member and said stop means respectively; a pin holding plate means having a plurality of station areas provided with openings adapted to carry some of said first and second pins; said plate means vertically movably located above said receiver; said plate means also rotatably movable about a generally vertical axis to carry variously dimensioned ones of said pins into position over said first and second openings in said receiver; index means for stopping rotation of said plate means in various positions to align said respective pins with said first and second openings in said receiver for placement of said pins therein; a table carriage upon which said work-holding table is movably mounted in said first direction, said table carriage thus movably mounting said work-holding table on said main frame; said table carriage movably mounted on said main frame to carry said work-holding table in a second direction substantially at right angles to said first direction; a second engaging member carried by said table carriage; said first stop means carried by said table carriage; a second stop means supported on said main frame in spaced relation to said second engaging member; a second position locating carriage movably mounted and rectilinearly movable between said second engaging means and said second stop means; third and fourth precision dimensioned members movably supported on said second locating carriage and adapted to be accumulatively engaged between said second engaging member and said second stop means; a second receiver for said third and fourth dimensioned members; said second receiver for said third and fourth dimensioned members; said second receiver having a plurality of third and fourth openings therein respectively adapted to receive said third and fourth dimensioned members, said third and fourth dimensioned members being pins of precisely varying diameters adapted to be placed in said respective openings of said second receiver and disposed, when therein, to be engaged with said second engaging member and said second stop means; a second pin-holding plate means having a plurality of station areas provided with openings adapted to carry some of said third and fourth pins; said second plate means vertically movably located above said second receiver; said second plate means also rotatably movable about a generally vertical axis to carry variously dimensioned ones of said third and fourth pins into position aligning with said third and fourth openings in said second receiver; second index means for stopping rotation of said second plate means in various positions to align said respective third and fourth pins with said third and fourth openings of said second receiver for placing said third and fourth pins in said third and fourth openings; said tool holding and driving means comprising turret means rotatably mounted on said main frame on a substantially vertical axis; a plurality of rotatably driven tool holders disposed in a circular row on said turret and radially spaced outward from said vertical axis of said turret means; a plurality of first switches adjacent said turret; a plurality of first switch operating members selectively and removably mounted in connection with said turret for actuating various ones of said first switches respective to various tool holders carried by said turret; second and third pluralities of switches carried by said first and second position locating carriages; and second and third pluralities of switch operating members movably carried by said first mentioned and second pin holding plate means respectively whereby said second and third pluralities of switch operating members may be selected to operate various ones of said second and third pluralities of switches carried by said first and second position locating carriages.

* * * * *